US012099746B2

(12) United States Patent
Balb et al.

(10) Patent No.: US 12,099,746 B2
(45) Date of Patent: Sep. 24, 2024

(54) INTERRUPT SIGNALING FOR A MEMORY DEVICE

(71) Applicant: Micron Technology, Inc., Boise, ID (US)

(72) Inventors: Markus Balb, Ottobrunn (DE); Thomas Hein, Munich (DE); Heinz Hoenigschmid, Poecking (DE)

(73) Assignee: Micron Technology, Inc., Boise, ID (US)

( * ) Notice: Subject to any disclaimer, the term of this patent is extended or adjusted under 35 U.S.C. 154(b) by 7 days.

(21) Appl. No.: 17/116,180

(22) Filed: Dec. 9, 2020

(65) Prior Publication Data

US 2021/0181990 A1 Jun. 17, 2021

Related U.S. Application Data

(60) Provisional application No. 62/948,738, filed on Dec. 16, 2019.

(51) Int. Cl.
*G06F 12/00* (2006.01)
*G06F 3/06* (2006.01)

(52) U.S. Cl.
CPC .......... *G06F 3/0659* (2013.01); *G06F 3/0619* (2013.01); *G06F 3/0679* (2013.01)

(58) Field of Classification Search
CPC ..... G06F 3/0619; G06F 3/0659; G06F 3/0679
(Continued)

(56) References Cited

U.S. PATENT DOCUMENTS 5,548,711 A * 8/1996 Brant ................... G06F 11/2094
714/E11.034
6,128,307 A * 10/2000 Brown .............. H04M 1/72403
712/E9.067

(Continued)

FOREIGN PATENT DOCUMENTS

| CN | 105814547 A | 7/2016 |
| CN | 109416654 A | 3/2019 |
| KR | 20190073055 A | 6/2019 |

OTHER PUBLICATIONS

ISA/KR, International Search Report and Written Opinion of the International Searching Authority, Int'l Appl. No. PCT/US2020/064238, Mar. 26, 2021, Korean Intellectual Property Office, Seo-gu, Daejeon, Republic of Korea, 9 pgs.

(Continued)

*Primary Examiner* — Mohamed M Gebril
(74) *Attorney, Agent, or Firm* — Holland & Hart LLP

(57) ABSTRACT

Methods, systems, and devices for interrupt signaling for a memory device are described. A memory device may transmit an interrupt signal to a host device to alter a sequence of operations that would otherwise be executed by the host device. The memory device may transmit the interrupt signal in response to detecting an error condition at the memory device, a performance degradation at the memory device, or another trigger event. In some examples, the memory device may include a dedicated interrupt pin for transmitting interrupt signals. Alternatively, the memory device may transmit interrupt signals via a pin also sued to transmit error detection codes. For example, the memory device may transmit an interrupt signal before or after an error detection code or may invert the error detection code to indicate the interrupt, in which case the inverted error detection code may act as an interrupt signal.

13 Claims, 11 Drawing Sheets

(58) Field of Classification Search
USPC .......................................................... 711/154
See application file for complete search history.

(56) References Cited

U.S. PATENT DOCUMENTS

| | | | |
|---|---|---|---|
| 6,681,269 B2* | 1/2004 | Hirabayashi | G06F 13/4291 |
| | | | 710/33 |
| 6,708,241 B1* | 3/2004 | Futral | G06F 13/24 |
| | | | 710/260 |
| 6,731,731 B1* | 5/2004 | Ueshima | G06F 21/31 |
| | | | 726/5 |
| 7,620,747 B1* | 11/2009 | Overby | G06F 13/385 |
| | | | 709/212 |
| 8,812,898 B1* | 8/2014 | Lahon | G06F 11/1443 |
| | | | 714/4.2 |
| 9,734,086 B2* | 8/2017 | Flynn | G06F 12/0868 |
| 10,496,475 B2* | 12/2019 | Zhang | G11C 29/50 |
| 10,545,893 B1* | 1/2020 | Xu | G06F 11/2043 |
| 2006/0010282 A1* | 1/2006 | Kim | G06F 11/1417 |
| | | | 714/E11.133 |
| 2007/0005829 A1* | 1/2007 | Fujimoto | G06F 13/385 |
| | | | 710/48 |
| 2007/0055823 A1* | 3/2007 | Jo | G06F 13/387 |
| | | | 711/115 |
| 2008/0082900 A1 | 4/2008 | Yoon | |
| 2008/0126852 A1* | 5/2008 | Brandyberry | G06F 11/0745 |
| | | | 714/6.13 |
| 2008/0256289 A1* | 10/2008 | Lee | G06F 3/0673 |
| | | | 711/E12.001 |
| 2008/0288550 A1* | 11/2008 | Wang | G06F 16/10 |
| 2009/0055713 A1* | 2/2009 | Hong | G06F 11/10 |
| | | | 714/763 |
| 2009/0164683 A1* | 6/2009 | Hobler | G06F 13/24 |
| | | | 710/266 |
| 2009/0327572 A1* | 12/2009 | Cho | G06F 13/4291 |
| | | | 711/E12.082 |
| 2010/0180061 A1* | 7/2010 | Toshimitsu | G06F 13/385 |
| | | | 710/305 |
| 2011/0041005 A1* | 2/2011 | Selinger | G11C 29/765 |
| | | | 714/48 |
| 2012/0117304 A1* | 5/2012 | Worthington | G06F 11/3037 |
| | | | 711/170 |
| 2012/0144244 A1* | 6/2012 | Dan | G11C 29/56 |
| | | | 714/39 |
| 2013/0036254 A1 | 2/2013 | Fai et al. | |
| 2013/0173986 A1* | 7/2013 | Sakata | H03M 13/2906 |
| | | | 714/755 |
| 2014/0026021 A1* | 1/2014 | Hill | G06F 11/1004 |
| | | | 714/E11.032 |
| 2014/0122777 A1* | 5/2014 | Oh | G06F 3/061 |
| | | | 711/103 |
| 2014/0365697 A1* | 12/2014 | Toyama | G06F 13/24 |
| | | | 710/262 |
| 2015/0058697 A1* | 2/2015 | Iwasaki | G06F 11/1048 |
| | | | 714/773 |
| 2015/0120978 A1 | 4/2015 | Kalyanasundharam et al. | |
| 2015/0135042 A1* | 5/2015 | Im | G06F 11/1004 |
| | | | 714/807 |
| 2016/0162355 A1 | 6/2016 | Mizrachi et al. | |
| 2018/0173619 A1* | 6/2018 | Sivasankaran | G06F 3/0679 |
| 2018/0293191 A1* | 10/2018 | Li | G06F 13/1689 |
| 2018/0307619 A1 | 10/2018 | Kalyanasundharam et al. | |
| 2018/0314593 A1* | 11/2018 | Zhang | G06F 11/1068 |
| 2018/0321844 A1 | 11/2018 | Benisty | |
| 2019/0129414 A1* | 5/2019 | Yasunami | G05D 1/0297 |
| 2019/0213070 A1* | 7/2019 | Takahashi | H04L 5/0055 |
| 2019/0258539 A1* | 8/2019 | Zhu | G06F 13/1668 |
| 2019/0267100 A1* | 8/2019 | Pan | G11C 16/26 |
| 2019/0303041 A1 | 10/2019 | Kim | |
| 2020/0319748 A1* | 10/2020 | Fleck | G06F 13/4282 |
| 2021/0181990 A1* | 6/2021 | Balb | G06F 3/0679 |
| 2022/0300172 A1* | 9/2022 | Kurita | G06F 3/0625 |

OTHER PUBLICATIONS

Chinese Patent Office, "Office Action," issued in connection with Chinese Patent Application No. 202080092529.4 dated Oct. 25, 2023 (32 pages total; 16 pages original & 16 machine translation).

* cited by examiner

INTERRUPT SIGNALING FOR A MEMORY DEVICE

CROSS REFERENCE

The present Application for Patent claims the benefit of U.S. Provisional Patent Application No. 62/948,738 by BALB et al., entitled "INTERRUPT SIGNALING FOR A MEMORY DEVICE," filed Dec. 16, 2019, assigned to the assignee hereof, and expressly incorporated by reference in its entirety herein.

BACKGROUND

The following relates generally to one or more memory systems and more specifically to interrupt signaling for a memory device.

Memory devices are widely used to store information in various electronic devices such as computers, wireless communication devices, cameras, vehicles, digital displays, and the like. Information is stored by programing memory cells within a memory device to various states. For example, binary memory cells may be programmed to one of two supported states, often denoted by a logic 1 or a logic 0. In some examples, a single memory cell may support more than two states, any one of which may be stored. To access the stored information, a component may read, or sense, at least one stored state in the memory device. To store information, a component may write, or program, the state in the memory device.

Various types of memory devices and memory cells exist, including magnetic hard disks, random access memory (RAM), read only memory (ROM), dynamic RAM (DRAM), synchronous dynamic RAM (SDRAM), ferroelectric RAM (FeRAM), magnetic RAM (MRAM), resistive RAM (RRAM), flash memory, phase change memory (PCM), self-selecting memory, chalcogenide memory technologies, and others. Memory cells may be volatile or non-volatile. Non-volatile memory, e.g., FeRAM, may maintain their stored logic state for extended periods of time even in the absence of an external power source. Volatile memory devices, e.g., DRAM, may lose their stored state when disconnected from an external power source.

DETAILED DESCRIPTION

Figure 1:
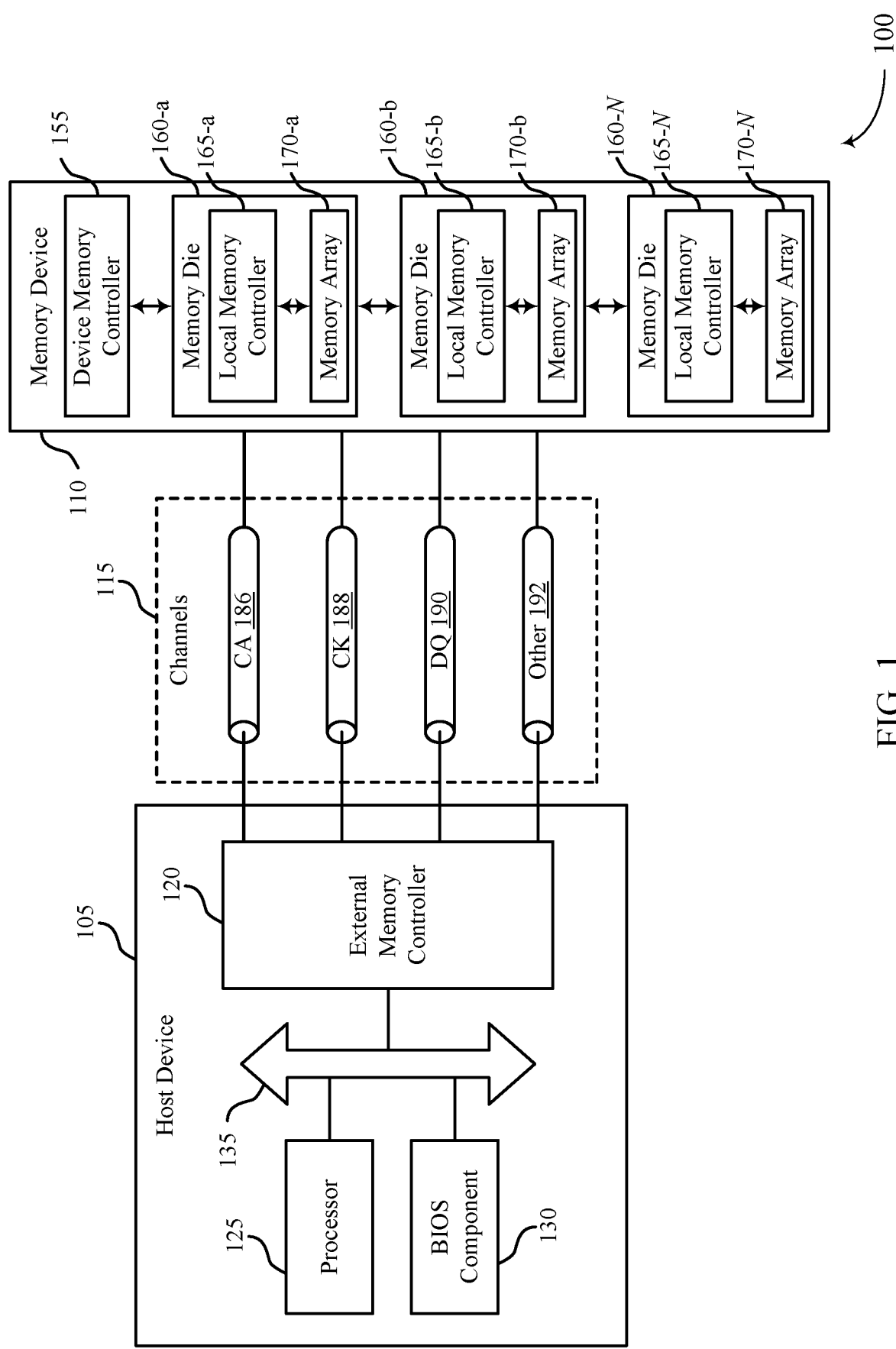
FIG. 1 illustrates an example of a system that supports interrupt signaling for a memory device in accordance with examples as disclosed herein.

In some cases, it may be desirable for a memory device to transmit an interrupt signal to a host device. The interrupt signal may be a signal that triggers a host device to alter a sequence of operations performed by a host device for the memory device (e.g., to take an action that, but for the interrupt signal, the host device would not have taken or would have taken at a different time). For example, such an interrupt signal may be useful in high-reliability applications (e.g., automotive applications), where such interrupts may support the host device performing corrective actions that mitigate or prevent adverse outcomes associated with the memory degrading or otherwise having a higher risk of failure.

For instance, the host device, upon receiving the interrupt, may transfer data from a degrading memory device to another memory device and may deactivate the degrading memory device or otherwise alter the configuration or operation of a system that includes the host device and the memory device. In some cases, the memory device may transmit the interrupt signal if parameters associated with the memory device indicate degradation or abnormal performance of the memory device. For instance, by way of non-limiting example, if a rate or count of errors (e.g., data errors) at the memory device exceeds a threshold amount, a voltage or a temperature of the memory device crosses a threshold, a fuse of the memory device blows, a phase lock loop (PLL) status indicates an out-of-lock situation, a data or other communications link for the memory device is identified as having a margin of error below a threshold, or any combination of one or more such trigger events occurs, the memory device may transmit the interrupt signal.

To transmit the interrupt signal, the memory device may include a dedicated interrupt pin or may leverage (use) another interface, such as an error detection code (EDC) pin. The EDC pin may be configured such that when data is transmitted from the memory device to the host device, the EDC pin may—with some timing relationship (e.g., concurrently or subsequently)—carry an error detection code for the data to the host device. In some cases, to indicate an interrupt, the memory device may transmit an interrupt signal over the EDC pin before or after transmitting the error detection code for the data. For example, the presence of signaling on the EDC pin outside of a time window allocated to an error detection code may indicate an interrupt. Alternatively, the memory device may invert the error detection code (e.g., in bitwise fashion, such as by inverting each individual bit of the error detection code) and may transmit an inverted error detection code to the host device, and the host device may determine that the host device is to perform an interrupt (e.g., the host device may recognize the signaling as an interrupt signal despite the signaling occurring during the window allocated to an error detection code) based on determining that the error detection code is inverted.

Features of the disclosure are initially described in the context of memory systems and dies as described with reference to FIGS. 1 and 2. Features of the disclosure are described in the context of a system configuration, an interrupt timing diagram, and a process flow, as described with reference to FIGS. 3-5. These and other features of the disclosure are further illustrated by and described with reference to an apparatus diagram and flowcharts that relate to interrupt signaling for a memory device as described with references to FIGS. 6-11.

FIG. 1 illustrates an example of a system 100 that utilizes one or more memory devices in accordance with examples as disclosed herein. The system 100 may include a host device 105, a memory device 110, and a plurality of channels 115 coupling the host device 105 with the memory device 110. The system 100 may include one or more memory devices 110, but aspects of the one or more memory devices 110 may be described in the context of a single memory device (e.g., memory device 110).

The system 100 may include portions of an electronic device, such as a computing device, a mobile computing device, a wireless device, a graphics processing device, a vehicle, or other systems. For example, the system 100 may illustrate aspects of a computer, a laptop computer, a tablet computer, a smartphone, a cellular phone, a wearable device, an internet-connected device, a vehicle controller, or the like. The memory device 110 may be a component of the system operable to store data for one or more other components of the system 100.

At least portions of the system 100 may be examples of the host device 105. The host device 105 may be an example of a processor or other circuitry within a device that uses memory to execute processes, such as within a computing device, a mobile computing device, a wireless device, a graphics processing device, a computer, a laptop computer, a tablet computer, a smartphone, a cellular phone, a wearable device, an internet-connected device, or some other stationary or portable electronic device, among other examples. In some examples, the host device 105 may refer to the hardware, firmware, software, or a combination thereof that implements the functions of an external memory controller 120. In some examples, the external memory controller 120 may be referred to as a host or a host device 105.

A memory device 110 may be an independent device or a component that is operable to provide physical memory addresses/space that may be used or referenced by the system 100. In some examples, a memory device 110 may be configurable to work with one or more different types of host devices. Signaling between the host device 105 and the memory device 110 may be operable to support one or more of: modulation schemes to modulate the signals, various pin configurations for communicating the signals, various form factors for physical packaging of the host device 105 and the memory device 110, clock signaling and synchronization between the host device 105 and the memory device 110, timing conventions, or other factors.

The memory device 110 may be operable to store data for the components of the host device 105. In some examples, the memory device 110 may act as a slave-type device to the host device 105 (e.g., responding to and executing commands provided by the host device 105 through the external memory controller 120). Such commands may include one or more of a write command for a write operation, a read command for a read operation, a refresh command for a refresh operation, or other commands.

The host device 105 may include one or more of an external memory controller 120, a processor 125, a basic input/output system (BIOS) component 130, or other components such as one or more peripheral components or one or more input/output controllers. The components of host device may be in coupled with one another using a bus 135.

The processor 125 may be operable to provide control or other functionality for at least portions of the system 100 or at least portions of the host device 105. The processor 125 may be a general-purpose processor, a digital signal processor (DSP), an application-specific integrated circuit (ASIC), a field-programmable gate array (FPGA) or other programmable logic device, discrete gate or transistor logic, discrete hardware components, or a combination of these components. In such examples, the processor 125 may be an example of a central processing unit (CPU), a graphics processing unit (GPU), a general purpose GPU (GPGPU), or a system on a chip (SoC), among other examples. In some examples, the external memory controller 120 may be implemented by or be a part of the processor 125.

The BIOS component 130 may be a software component that includes a BIOS operated as firmware, which may initialize and run various hardware components of the system 100 or the host device 105. The BIOS component 130 may also manage data flow between the processor 125 and the various components of the system 100 or the host device 105. The BIOS component 130 may include a program or software stored in one or more of ROM, flash memory, or other non-volatile memory.

The memory device 110 may include a device memory controller 155 and one or more memory dies 160 (e.g., memory chips) to support a desired capacity or a specified capacity for data storage. Each memory die 160 may include a local memory controller 165 (e.g., local memory controller 165-a, local memory controller 165-b, local memory controller 165-N) and a memory array 170 (e.g., memory array 170-a, memory array 170-b, memory array 170-N). A memory array 170 may be a collection (e.g., one or more grids, one or more banks, one or more tiles, one or more sections) of memory cells, with each memory cell being operable to store at least one bit of data. A memory device 110 including two or more memory dies may be referred to as a multi-die memory or a multi-die package or a multi-chip memory or a multi-chip package.

The device memory controller 155 may include circuits, logic, or components operable to control operation of the memory device 110. The device memory controller 155 may include the hardware, the firmware, or the instructions that enable the memory device 110 to perform various operations and may be operable to receive, transmit, or execute commands, data, or control information related to the components of the memory device 110. The device memory controller 155 may be operable to communicate with one or more of the external memory controller 120, the one or more memory dies 160, or the processor 125. In some examples, the device memory controller 155 may control operation of the memory device 110 described herein in conjunction with the local memory controller 165 of the memory die 160.

In some examples, the memory device 110 may receive data or commands or both from the host device 105. For example, the memory device 110 may receive a write command indicating that the memory device 110 is to store data for the host device 105 or a read command indicating that the memory device 110 is to provide data stored in a memory die 160 to the host device 105.

A local memory controller 165 (e.g., local to a memory die 160) may be operable to control operation of the memory die 160. In some examples, a local memory controller 165 may be operable to communicate (e.g., receive or transmit data or commands or both) with the device memory controller 155. In some examples, a memory device 110 may not include a device memory controller 155, and a local memory controller 165, or the external memory controller 120 may perform various functions described herein. As such, a local memory controller 165 may be operable to communicate with the device memory controller 155, with other local memory controllers 165, or directly with the external memory controller 120, or the processor 125, or a combination thereof. Examples of components that may be included in the device memory controller 155 or the local memory controllers 165 or both may include receivers for receiving signals (e.g., from the external memory controller 120), transmitters for transmitting signals (e.g., to the external memory controller 120), decoders for decoding or demodulating received signals, encoders for encoding or modulating signals to be transmitted, or various other circuits or controllers operable for supporting described operations of the device memory controller 155 or local memory controller 165 or both.

The external memory controller 120 may be operable to enable communication of one or more of information, data, or commands between components of the system 100 or the host device 105 (e.g., the processor 125) and the memory device 110. The external memory controller 120 may convert or translate communications exchanged between the components of the host device 105 and the memory device 110. In some examples, the external memory controller 120 or other component of the system 100 or the host device 105, or its functions described herein, may be implemented by the processor 125. For example, the external memory controller 120 may be hardware, firmware, or software, or some combination thereof implemented by the processor 125 or other component of the system 100 or the host device 105. Although the external memory controller 120 is depicted as being external to the memory device 110, in some examples, the external memory controller 120, or its functions described herein, may be implemented by one or more components of a memory device 110 (e.g., a device memory controller 155, a local memory controller 165) or vice versa.

The components of the host device 105 may exchange information with the memory device 110 using one or more channels 115. The channels 115 may be operable to support communications between the external memory controller 120 and the memory device 110. Each channel 115 may be examples of transmission mediums that carry information between the host device 105 and the memory device. Each channel 115 may include one or more signal paths or transmission mediums (e.g., conductors) between terminals associated with the components of system 100. A signal path may be an example of a conductive path operable to carry a signal. For example, a channel 115 may include a first terminal including one or more pins or pads at the host device 105 and one or more pins or pads at the memory device 110. A pin may be an example of a conductive input or output point of a device of the system 100, and a pin may be operable to act as part of a channel.

Channels 115 (and associated signal paths and terminals) may be dedicated to communicating one or more types of information. For example, the channels 115 may include one or more command and address (CA) channels 186, one or more clock signal (CK) channels 188, one or more data (DQ) channels 190, one or more other channels 192, or a combination thereof. In some examples, may be communicated over the channels 115 using single data rate (SDR) signaling or double data rate (DDR) signaling. In SDR signaling, one modulation symbol (e.g., signal level) of a signal may be registered for each clock cycle (e.g., on a rising or falling edge of a clock signal). In DDR signaling, two modulation symbols (e.g., signal levels) of a signal may be registered for each clock cycle (e.g., on both a rising edge and a falling edge of a clock signal).

In some examples, the channels 115 may include one or more command and address (CA) channels 186. The CA channels 186 may be operable to communicate commands between the host device 105 and the memory device 110 including control information associated with the commands (e.g., address information). For example, the CA channel 186 may include a read command with an address of the desired data. In some examples, a CA channel 186 may include any quantity of signal paths to decode one or more of address or command data (e.g., eight or nine signal paths).

In some examples, the channels 115 may include one or more clock signal channels 188 (e.g., CK channels). The clock signal channels 188 may be operable to communicate one or more clock signals between the host device 105 and the memory device 110. Each clock signal may be operable to oscillate between a high state and a low state, and may support coordination (e.g., in time) between actions of the host device 105 and the memory device 110. In some examples, the clock signal may be single ended. In some examples, the clock signal may provide a timing reference for command and addressing operations for the memory device 110, or other system-wide operations for the memory device 110. A clock signal therefore may be referred to as a control clock signal, a command clock signal, or a system clock signal. A system clock signal may be generated by a system clock, which may include one or more hardware components (e.g., oscillators, crystals, logic gates, transistors).

In some examples, the channels 115 may include one or more data (DQ) channels 190. The data channels 190 may be operable to communicate one or more of data or control information between the host device 105 and the memory device 110. For example, the data channels 190 may communicate information (e.g., bi-directional) to be written to the memory device 110 or information read from the memory device 110.

The channels 115 may include any quantity of signal paths (including a single signal path). In some examples, a channel 115 may include multiple individual signal paths. For example, a channel may be x4 (e.g., including four signal paths), x8 (e.g., including eight signal paths), x16 (including sixteen signal paths), etc.

In some examples, the one or more other channels 192 may include one or more error detection code (EDC) channels. The EDC channels may be operable to communicate error detection signals, such as checksums, to improve system reliability. An EDC channel may include any quantity of signal paths. In some cases, an EDC channel may be referred to as an EDC back channel.

The one or more other channels 192 may include one or more interrupt channels. An interrupt channel may be any channel operable to communicate interrupt signals to a host device 105 or a memory device 110 (e.g., signals that cause the host device 105 or the memory device 110) to alter a sequence of operations. For instance, the memory device 110 may transmit a signal via an interrupt channel that triggers the host device 105 to transmit a request for information to the memory device 110. In some cases, the one or more interrupt channels may be the same as the one or more EDC channels. In other cases, the one or more interrupt channels may be dedicated interrupt channels (channels dedicated to carrying interrupt signals).

Additionally or alternatively, the one or more other channels 192 may include one or more Joint Test Action Group (JTAG) channels. The JTAG channels may be operable to transmit signals according to the JTAG standard (e.g., Institute of Electrical and Electronics Engineers (IEEE) 1149.X). A JTAG channel may include any quantity of signal paths. In some examples, as described with reference to FIGS. 3 and 4, the JTAG channel may be operable to communicate an indication of a value of an operating parameter for the memory device.

It may be desirable for a memory device 110 to transmit an interrupt signal to a host device 105 in a variety of circumstances. For example, such an interrupt signal may be useful in high-reliability applications, such as automotive applications, where such interrupts may enable the host device 105 to perform corrective actions that mitigate or prevent adverse outcomes associated with the memory degrading or otherwise having a higher risk of failure. For instance, the host device 105, upon receiving the interrupt, may transfer data from a degrading memory device to another memory device and may deactivate the degrading memory device, or may alter an operating mode or parameter of the degrading memory device, to avoid, delay, or mitigate the degradation.

In one example scenario, the host device 105 may transmit a read command for data stored at the memory device 110 via a CA channel 186. The memory device 110 may transmit the data via a data channel 190. Additionally, the memory device 110 may transmit an indication of an interrupt and an error detection code via one or more EDC channels. The indication of the interrupt may be transmitted before, after, or concurrently with the error detection code. The host device 105 may in some cases identify signaling over an EDC channel as indicating an interrupt based on a timing relationship between the signaling and the error detection code. To transmit the indication of the interrupt concurrently with the error detection code, the memory device 110 may determine a bitwise inversion of the error detection code and may transmit the inverted error detection code to indicate the indication of the interrupt. Alternatively, the memory device 110 may have a dedicated interrupt pin and may transmit the interrupt signaling over the interrupt channel—in such cases, the interrupt channel may be separate and distinct from an EDC channel.

Figure 2:
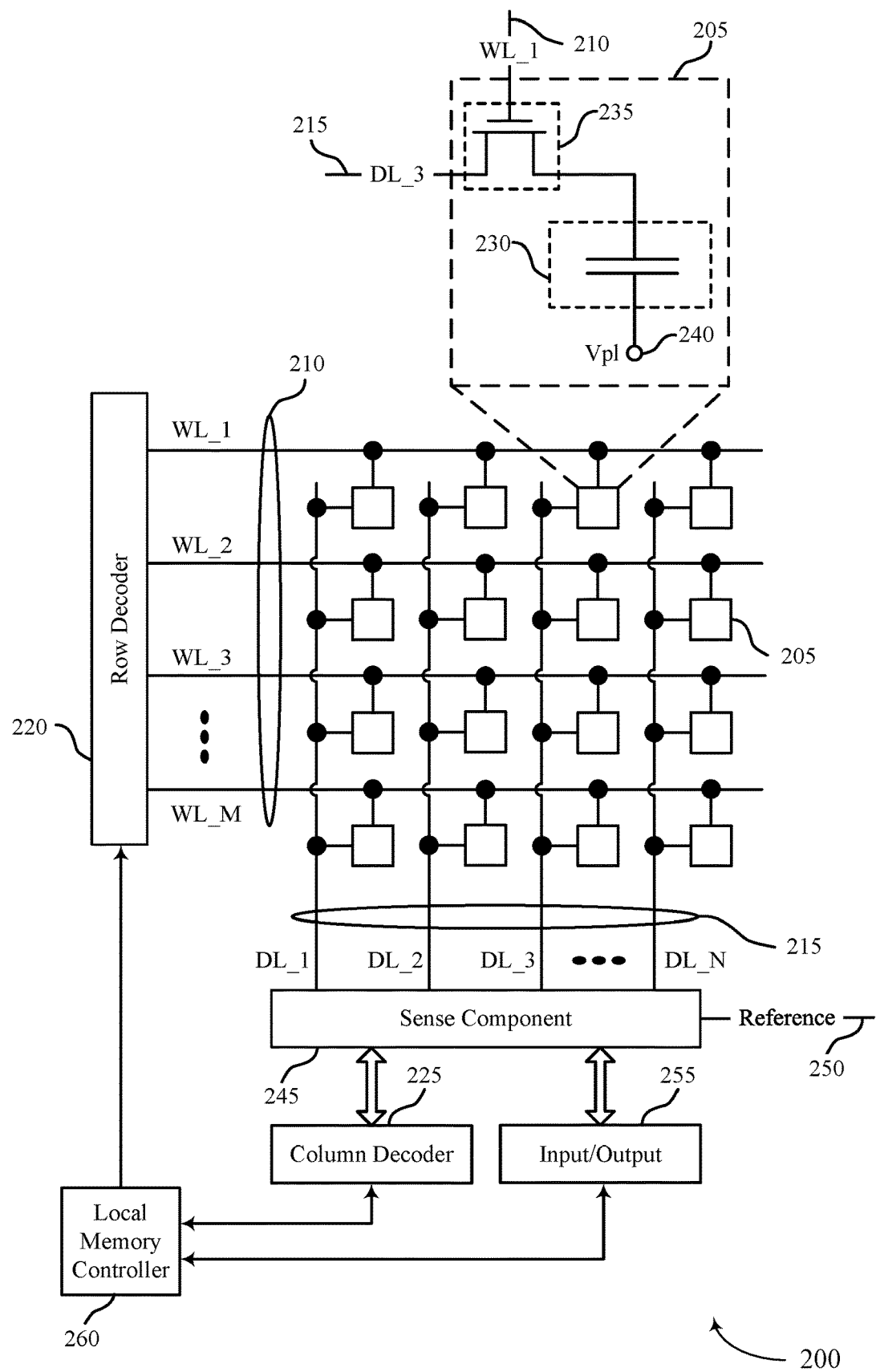
FIG. 2 illustrates an example of a memory die that supports interrupt signaling for a memory device in accordance with examples as disclosed herein.

FIG. 2 illustrates an example of a memory die 200 in accordance with examples as disclosed herein. The memory die 200 may be an example of the memory dies 160 described with reference to FIG. 1. In some examples, the memory die 200 may be referred to as a memory chip, a memory device, or an electronic memory apparatus. The memory die 200 may include one or more memory cells 205 that may each be programmable to store different logic states (e.g., a programmed one of a set of two or more possible states). For example, a memory cell 205 may be operable to store one bit of information at a time (e.g., a logic 0 or a logic 1). In some examples, a memory cell 205 (e.g., a multi-level memory cell) may be operable to store more than one bit of information at a time (e.g., a logic 00, logic 01, logic 10, a logic 11).

A memory cell 205 may store a charge representative of the programmable states in a capacitor. DRAM architectures may include a capacitor that includes a dielectric material to store a charge representative of the programmable state. In other memory architectures, other storage devices and components are possible. For example, nonlinear dielectric materials may be employed. The memory cell 205 may include a logic storage component, such as capacitor 230 and a switching component 235. The capacitor 230 may be an example of a dielectric capacitor or a ferroelectric capacitor. A node of the capacitor 230 may be coupled with a voltage source 240, which may be the cell plate reference voltage, such as Vpl, or may be ground, such as Vss.

The memory die 200 may include one or more access lines (e.g., one or more word lines 210 and one or more digit lines 215) arranged in a pattern, such as a grid-like pattern. An access line may be a conductive line coupled with a memory cell 205 and may be used to perform access operations on the memory cell 205. In some examples, word lines 210 may be referred to as row lines. In some examples, digit lines 215 may be referred to as column lines or bit lines. References to access lines, row lines, column lines, word lines, digit lines, or bit lines, or their analogues, are interchangeable without loss of understanding or operation. Memory cells 205 may be positioned at intersections of the word lines 210 and the digit lines 215.

Operations such as reading and writing may be performed on the memory cells 205 by activating or selecting access lines such as one or more of a word line 210 or a digit line 215. By biasing a word line 210 and a digit line 215 (e.g., applying a voltage to the word line 210 or the digit line 215), a single memory cell 205 may be accessed at their intersection. The intersection of a word line 210 and a digit line 215 in either a two-dimensional or three-dimensional configuration may be referred to as an address of a memory cell 205.

Accessing the memory cells 205 may be controlled through a row decoder 220 or a column decoder 225. For example, a row decoder 220 may receive a row address from the local memory controller 260 and activate a word line 210 based on the received row address. A column decoder 225 may receive a column address from the local memory controller 260 and may activate a digit line 215 based on the received column address.

Selecting or deselecting the memory cell 205 may be accomplished by activating or deactivating the switching component 235 using a word line 210. The capacitor 230 may be coupled with the digit line 215 using the switching component 235. For example, the capacitor 230 may be isolated from digit line 215 when the switching component 235 is deactivated, and the capacitor 230 may be coupled with digit line 215 when the switching component 235 is activated.

The sense component 245 may be operable to detect a state (e.g., a charge) stored on the capacitor 230 of the memory cell 205 and determine a logic state of the memory cell 205 based on the stored state. The sense component 245 may include one or more sense amplifiers to amplify or otherwise convert a signal resulting from accessing the memory cell 205. The sense component 245 may compare a signal detected from the memory cell 205 to a reference 250 (e.g., a reference voltage). The detected logic state of the memory cell 205 may be provided as an output of the sense component 245 (e.g., to an input/output 255), and may indicate the detected logic state to another component of a memory device that includes the memory die 200.

The local memory controller 260 may control the accessing of memory cells 205 through the various components (e.g., row decoder 220, column decoder 225, sense component 245). The local memory controller 260 may be an example of the local memory controller 165 described with reference to FIG. 1. In some examples, one or more of the row decoder 220, column decoder 225, and sense component 245 may be co-located with the local memory controller 260. The local memory controller 260 may be operable to receive one or more of commands or data from one or more different memory controllers (e.g., an external memory controller 120 associated with a host device 105, another controller associated with the memory die 200), translate the commands or the data (or both) into information that can be used by the memory die 200, perform one or more operations on the memory die 200, and communicate data from the memory die 200 to a host device 105 based on performing the one or more operations. The local memory controller 260 may generate row signals and column address signals to activate the target word line 210 and the target digit line 215. The local memory controller 260 may also generate and control various voltages or currents used during the operation of the memory die 200. In general, the amplitude, the shape, or the duration of an applied voltage or current discussed herein may be varied and may be different for the various operations discussed in operating the memory die 200.

The local memory controller 260 may be operable to perform one or more access operations on one or more memory cells 205 of the memory die 200. Examples of access operations may include a write operation, a read operation, a refresh operation, a precharge operation, or an activate operation, among others. The local memory controller 260 may be operable to perform other access operations not listed here or other operations related to the operating of the memory die 200 that are not directly related to accessing the memory cells 205.

In some cases, memory die 200 may deteriorate or may be subjected to conditions which increase the risk or rate of memory die 200 becoming deteriorated. For instance, if a temperature or a voltage of memory die 200 or of one of its components exceeds a threshold, memory die 200 may be susceptible to damage. Additionally or alternatively, a PLL of memory die 200 going out of lock, a fuse (or antifuse) of memory die 200 blowing, a rate or count of error corrections performed by memory die 200, or a condition of a communications link (channel) for or coupled with the memory device may indicate that memory die 200 is failing or has a heightened risk of failure. These or other events may trigger memory die 200 or a memory device 110 that includes memory die 200 to transmit an interrupt signal to a host device 105. The interrupt signal may trigger the host device 105 to alter a sequence of operations by the host device 105 for the memory device 110. Further exemplary details of such steps may be described with reference to FIGS. 3 and 4.

Figure 3:
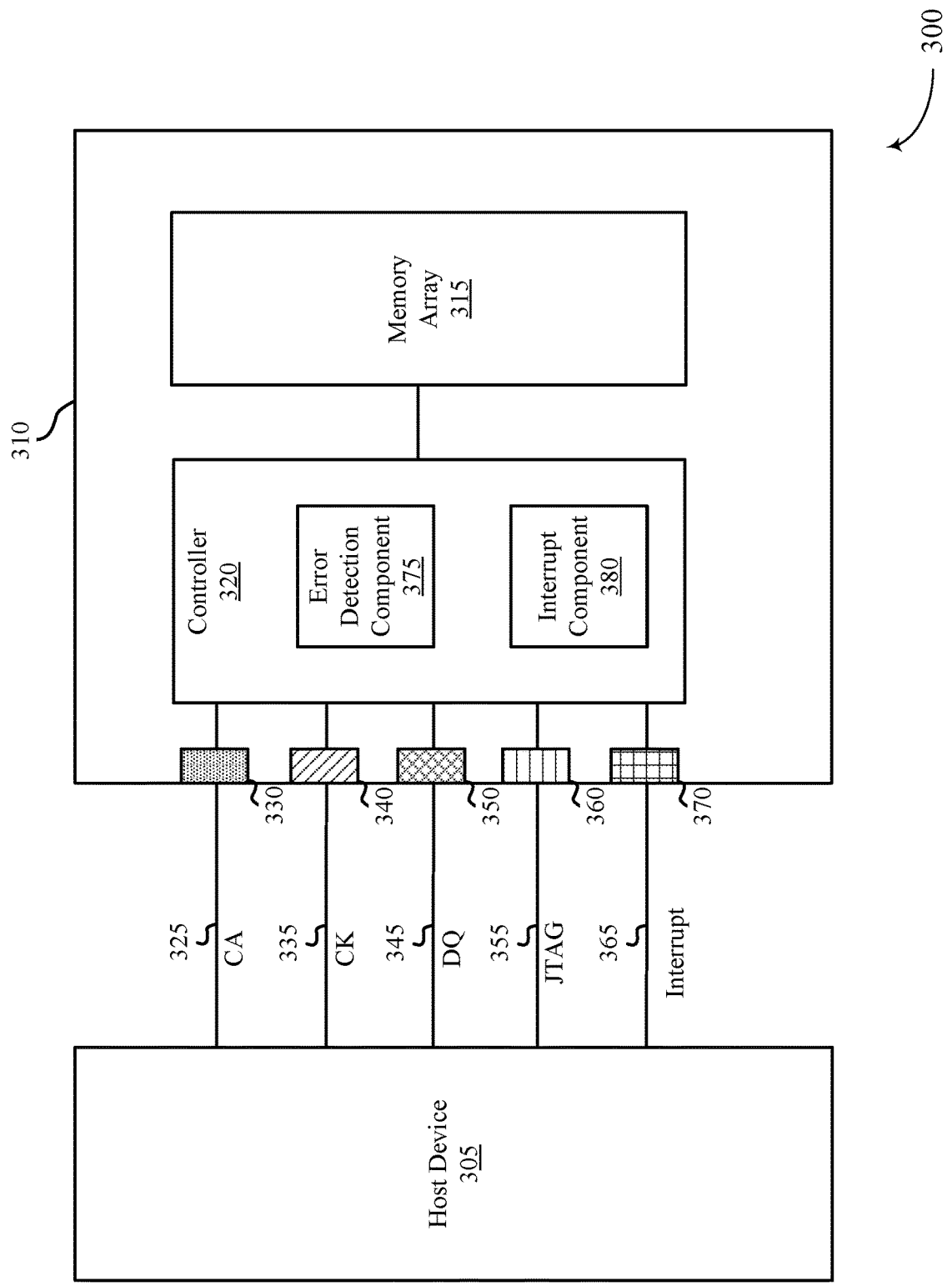
FIG. 3 illustrates an example of a system configuration that supports interrupt signaling for a memory device in accordance with examples as disclosed herein.

FIG. 3 illustrates an example of a system configuration 300 that supports interrupt signaling for a memory device in accordance with examples as disclosed herein. For example, system configuration 300 may include a host device 305 that may be coupled with a memory device 310.

The host device 305 and the memory device 310 may be coupled with one another. For example, the host device 305 and the memory device 310 may exchange commands (e.g., read or write commands) via CA channel 325, which may be an example of a CA channel 186 as described with reference to FIG. 1. The host device 305 and the memory device 310 may exchange clock signals via CK channel 335, which may be an example of a CK channel 188 as described with reference to FIG. 1. The host device 305 and the memory device 310 may exchange data (e.g., corresponding to read or write commands) via DQ channel 345, which may be an example of a DQ channel 190 as described with reference to FIG. 1.

The host device 305 and the memory device 310 may also exchange interrupt signaling via interrupt channel 365, which may be an example of an interrupt channel as described with reference to FIG. 1. In some cases, channel 365 may additionally be an EDC channel as described with reference to FIG. 1 that is configured to additionally carry interrupt signaling. As another example, channel 365 may be dedicated to carrying interrupt signaling. In this latter example, host device 305 and memory device 310 may exchange error detection codes via an EDC channel separate from interrupt channel 365 (not shown).

The host device 305 and the memory device 310 may also exchange requests for information and operational information (e.g., values of one or more operating parameters) via JTAG channel 355, which may be an example of a JTAG channel as described herein.

Memory device 310 may include memory array 315 and controller 320, which may be coupled with memory array 315. The memory array 315 may include memory cells of any type (e.g., not- and (NAND) memory, ferroelectric memory, phase change memory (PCM), random access memory (RAM), dynamic RAM (DRAM), synchronous dynamic RAM (SDRAM), etc.). The controller 320 may be an example of a local memory controller or a device memory controller as described with reference to FIG. 1. Memory device 310 also may include interfaces 330, 340, 350, 360, and 370, which may be coupled with and configured to receive or transmit signals via channels 325, 335, 345, 355, and 365, respectively. Each of the interfaces 330, 340, 350, 360, and 370 may be included in a same die as or otherwise also coupled with controller 320. Though one memory array 315 and controller 320 are shown in the example of FIG. 3, it is to be understood that memory device 310 may include any number of memory arrays 315 and controllers 320, distributed across any number of dies within memory device 310.

Memory device may also include error detection component 375 and interrupt component 380. As shown in FIG. 3, error detection component 375 and interrupt component 380 may in some cases be included in controller 320. Error detection component 375 and interrupt component 380 may alternatively be coupled with controller 320 or with each other. The functions ascribed herein to error detection component 375 and interrupt component 380 may alternatively be integrated into a single component or may be distributed across any number of separate components.

Error detection component 375 may determine an error detection code for data transmitted from the memory device 310 to the host device 305 via DQ interface 350 (e.g., for data read from the memory array 315 in response to a read command received by the memory device 310 via CA interface 330). Error detection component 375 also may transmit the error detection code from the memory device 310 to the host device 305 over an EDC channel. In some examples, the EDC channel may be the interrupt channel 365, and the EDC interface may be the interrupt interface 370. In other examples, the EDC channel may be separate and distinct from the interrupt channel 365 (and thus may not be shown in FIG. 3), and the EDC interface may be separate and distinct from the interrupt interface 370 (and thus may not be shown in FIG. 3).

The error detection code may be transmitted over the EDC channel (via a corresponding EDC interface) at a fixed or otherwise preconfigured (e.g., standardized) time relative to when the corresponding data (based upon which the error detection component 375 computed (calculated, generated) the error detection code) is transmitted via the DQ interface 350. For example, the error detection code may be transmitted over the EDC channel during a time window with a start time that occurs with a fixed or otherwise preconfigured delay after the corresponding data is transmitted via the DQ interface 350. The host device 305 may use the error detection code to determine whether any errors (e.g., transmission errors) are associated with the data. More details about the functions of error detection component 375 may be described with reference to FIG. 4.

Interrupt component 380 may perform status monitoring for memory device 310 and generate interrupt signals based on the status monitoring. For instance, interrupt component 380 may determine if a voltage or a temperature of the memory device 310 crosses a threshold, a fuse of the memory device 310 blows, a PLL status indicates an out-of-lock situation, a count or rate of error corrections performed by the memory device 310 exceeds a threshold, a condition of a communications link (e.g., DQ channel 345) deteriorates beyond a threshold (e.g., fails a status check, is determined to have a margin of error below a threshold), or any combination of one or more such trigger events. Alternatively, the memory device 310 may receive a message from another component of memory device 310 that indicates to interrupt component 380 that an interrupt signal is to be generated and transmitted. In either example, the interrupt interface 370 may transmit the interrupt signaling via interrupt interface 370 (and thus interrupt channel 365).

In some examples where interrupt channel 365 is an EDC channel, interrupt component 380 may transmit an interrupt signal via the interrupt interface 370 before or after an error detection code (e.g., an error detection code determined by error detection component 375) is transmitted via the interrupt interface 370. In other such examples, interrupt component 380 may invert (or instruct error detection component 375 to invert) bits of the error detection code, where the inverted error detection code serves as the interrupt signal. Alternatively, interrupt channel 365 may be a dedicated interrupt channel (e.g., used exclusively to carry interrupt signals), and interrupt component 380 may transmit an interrupt signal at any time. More details about the functions of interrupt component 380 may be described with reference to FIG. 4.

In response to receiving an interrupt signal via the interrupt channel 365, host device 305 may alter a sequence of operations that the host device 305 would otherwise have executed. For instance, in response to receiving an interrupt signal, host device 305 may transmit to memory device 310 a request for information via CA channel 325 or JTAG channel 355. Upon receiving the request for information, memory device 310 may transmit a value of an operating parameter for the memory device 310 (e.g., a voltage, a temperature, a status of one or more fuses, a PLL status, a rate of error corrections, a flag indicating an operability of memory device 310, a margin of error or other information regarding a status of a communications link (e.g., data link), or any set of one or more such trigger events). For example, the memory device 310 may transmit the value of the operating parameter via an EDC interface or JTAG interface 360.

In some cases, the JTAG interface 360 may be coupled with an external controller (which may be referred as a JTAG controller) instead of host device 305. The external controller may in turn be coupled with the host device 305. In such cases, the request for information may be relayed via the external controller from host device 305 to the JTAG interface 360. Additionally or alternatively, the value of the operating parameter for the memory device 310 may be relayed via the external controller from JTAG interface 360 to host device 305.

Figure 4:
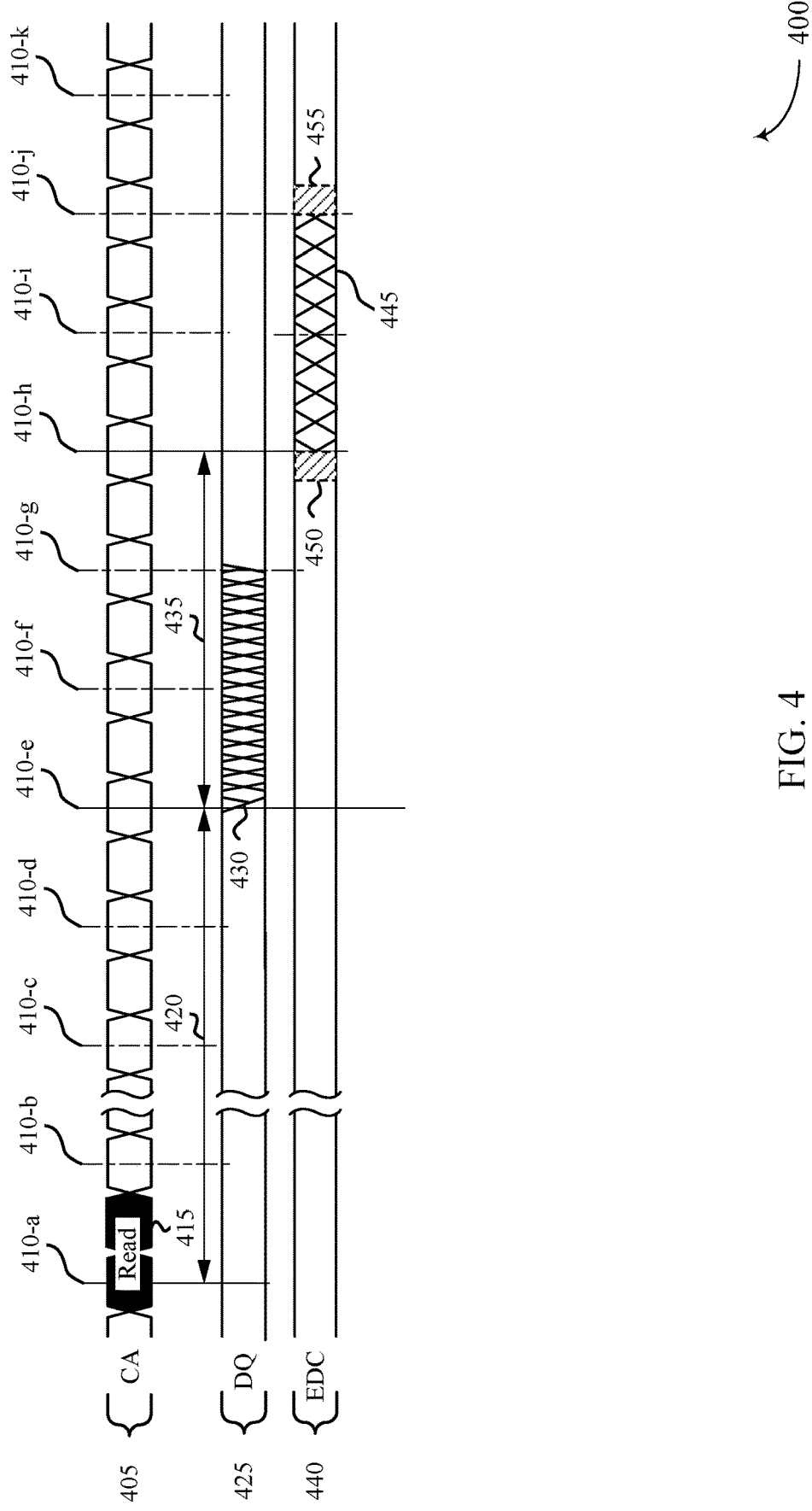
FIG. 4 illustrates an example of an interrupt timing diagram that supports interrupt signaling for a memory device in accordance with examples as disclosed herein.

FIG. 4 illustrates an example of an interrupt timing diagram 400 that supports interrupt signaling for a memory device in accordance with examples as disclosed herein. Interrupt timing diagram 400 may represent communications undertaken by CA channel 325, DQ channel 345, and interrupt channel 365 to indicate an interrupt to a host device. Accordingly, CA timing 405 may represent the timing of signaling transmitted over CA channel 325, DQ timing 425 may represent the timing of signaling transmitted over DQ channel 345, and EDC timing 440 may represent the timing of signaling transmitted over an interrupt channel 365 in accordance with an example in which the interrupt channel 365 is an EDC channel.

The timing diagram 400 may be determined by a clock signal transmitted over a CK channel 335, where a unit interval 410 may correspond to either a either a full or a half clock cycle depending on whether SDR or DDR signaling is used. At or before unit interval 410-$a$, memory device 310 may receive a read command 415 from host device 305 over CA channel 325. The read command may indicate to memory device 310 to transmit data to host device 305. A timing gap $RL_{mrs}$ 420 (e.g., a quantity of unit intervals 410 including unit intervals 410-$a$, 410-$b$, 410-$c$, and 410-$d$) may elapse between a unit interval 410 when the read command 415 was received (e.g., unit interval 410-$a$) and a unit interval 410 when data 430 is transmitted (e.g., unit interval 410-$e$). Generally, timing gap $RL_{mrs}$ 420 may have a value identified at (e.g., known to) the host device 305 (e.g., timing gap $RL_{mrs}$ 420 may be predefined by a manufacturer or standardized)

Beginning at unit interval 410-$e$, memory device 310 may transmit data 430 that corresponds to the read command 415. The memory device 310 may transmit the data 430 over unit intervals 410-$e$ and 410-$f$. A timing gap CRCRL 435 (e.g., a quantity of unit intervals 410 including unit intervals 410-$e$, 410-$f$, and 410-$g$) may exist between the unit interval 410 when transmission of the data began (e.g., unit interval 410-$e$) to a unit interval 410 when transmission of an error detection code 445 begins (e.g., unit interval 410-$h$). Generally, timing gap CRCRL 435 may have a value identified at (e.g., known to) the host device 305 (e.g., timing gap CRCRL 435 may be predefined by a manufacturer or industry standard, such as a Joint Electron Device Engineering Council (JEDEC) standard).

Beginning at unit interval 410-$h$, memory device 310 may transmit an error detection code 445 for data 430. The memory device 310 may transmit the error detection code 445 over unit intervals 410-$h$ and 410-$i$. Generally, the quantity of symbols transmitted for the error detection code 445 or the number of EDC channels over which the error detection code 445 is transmitted may vary. For instance, a first quantity of symbols may be transmitted for a full data rate and a second quantity of symbols may be transmitted for a half data rate, either over a different quantity of unit intervals or over different quantity of EDC channels. The host device 305 may receive the error detection code 445. In some cases, error detection code 445 may be a type of cyclic redundancy check (CRC) that is generated by the memory device 310 based on data 430, and which may support an error correction or detection procedure performed by the host device 305 (e.g., to identify whether any transmission errors occurred with respect to the transmission of data 430).

In some cases, to provide an indication of interrupt, the memory device 310 may transmit an interrupt flag (signal) before or after the error detection code 445. In one example, memory device 310 may transmit interrupt flag 450 prior to the error detection code 445 (e.g., immediately prior to unit interval 410-$h$). In another example, memory device 310 may transmit interrupt flag 455 prior to error detection code 445 (e.g., immediately after unit interval 410-$j$). In some cases, the host device 305, upon receiving the interrupt flag (e.g., interrupt flag 450 or 455) may identify the interrupt flag 450 based on a timing relationship with the error detection code 445 (e.g., timing gaps $RL_{mrs}$ 420 and CRCRL 435, whether any signaling is on the EDC timing 440 before or after the expected start or end time for the transmission of the error detection code 445). In some cases, the interrupt flag occur at a time when the EDC timing 440 would otherwise be operated in accordance with an error detection code hold pattern (e.g., a static condition). In response to receiving the interrupt flag 450, the host device 305 may perform an interrupt as described with reference to FIG. 3 accordingly.

In some cases, to provide the indication of the interrupt, the memory device 310 may transmit an inverted version of the error detection code 445. For example, the memory device 310 may perform a bitwise inversion on the error detection code 445 prior to transmission. For instance, if the original error detection code is '10010', the bitwise inverted error detection code 445 may be '01101.' The memory device 310 may transmit the bitwise-inverted error detection code 445 in lieu of the error detection code initially calculated (computed, generated) based on data 430 by the memory device 310, which may be referred to as the original error detection code. Host device 305, upon receiving data 430, may determine the original error detection code based on the data 430. By comparing the original error detection code with the received bitwise inverted error detection code 445, the memory device 310 may determine that the bitwise inverted error detection code 445 is a version of the original error detection code that has undergone bitwise inversion. And by determining that the error detection code 445 is the bitwise inverse of an error detection code calculated (computed, generated) by the host device based on data 430, the host device 305 may identify the error detection code 445 as an indication to perform an interrupt (e.g., the likelihood of received error detection code 445 and the error detection code calculated by the host device 305 based on data 430 unintentionally being different from one another such that one is a bitwise inversion of the other may be statistically near impossible). In response to receiving the interrupt flag 450, the host device 305 may perform the interrupt as described with reference to FIG. 3 accordingly.

Transmitting the indication of the interrupt via an EDC channel may allow a memory device to communicate an indication of an interrupt without the addition of a dedicated interrupt pin, which may conserve pin count for the memory device 310 and the host device 305. Additionally, transmitting the indication of the interrupt may provide the memory device 310 with a real-time update capability for reacting to changing conditions of the memory device 310 and updating the host device 305 accordingly. Additionally, the methods as described with regards to FIG. 4 may allow a memory device 310 to interrupt pending commands and/or to flag a host device 305 when commands are issued.

Figure 5:
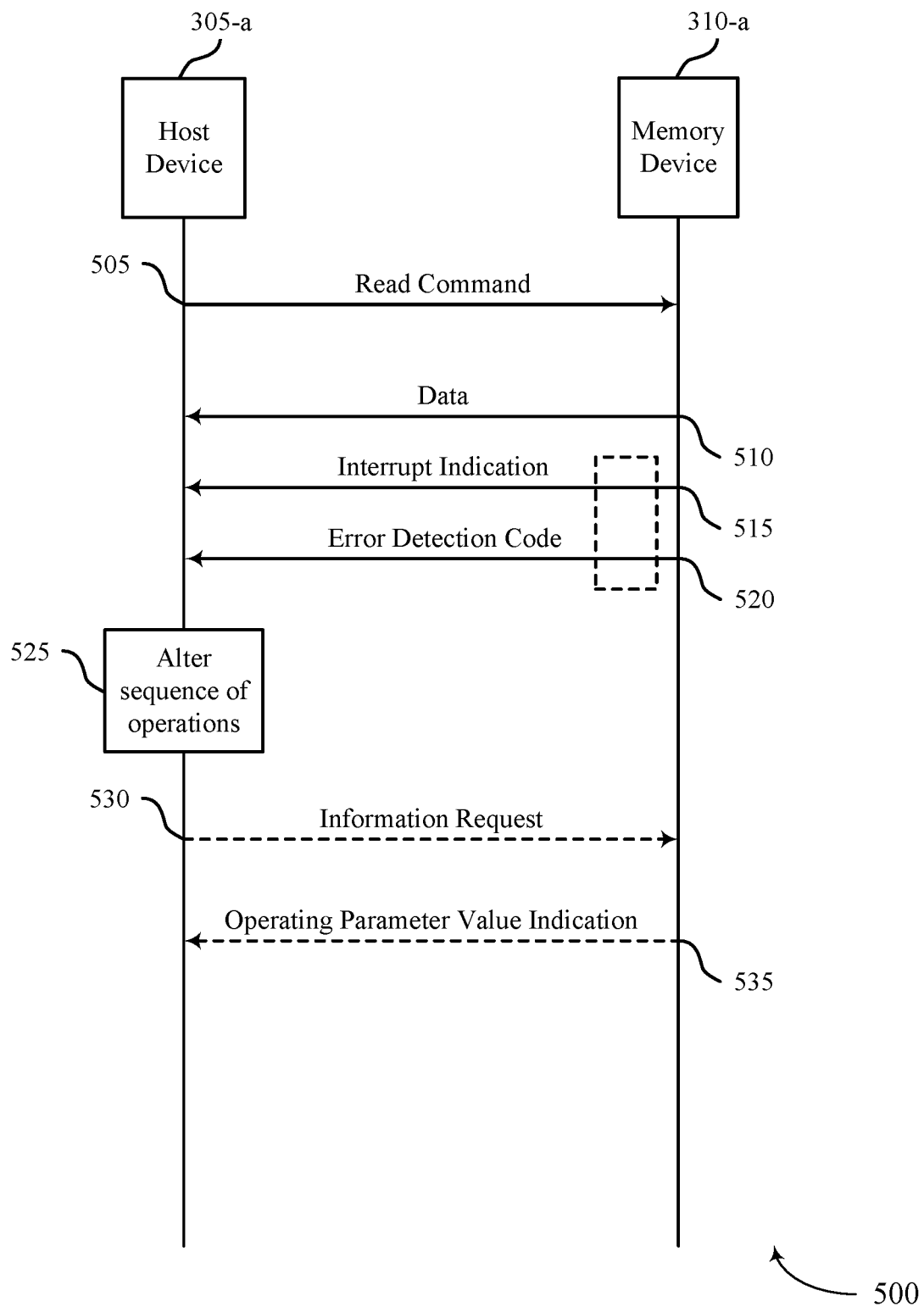
FIG. 5 illustrates an example of a process flow that supports interrupt signaling for a memory device in accordance with examples as disclosed herein.

FIG. 5 illustrates an example of a process flow 500 that supports interrupt signaling for a memory device in accordance with examples as disclosed herein. For example, host device 305-a may be an example of a host device 305 as described with reference to FIG. 3 and memory device 310-a may be an example of a memory device 310 as described with reference to FIG. 3.

At 505, host device 305-a may transmit a read command for data stored at memory device 310-a. Memory device 310-a may receive the read command (e.g., via a CA interface).

At 510, memory device 310-a may transmit data via a first interface (e.g., a data interface). Host device 305-a may receive the data.

At 515, memory device 310-a may transmit an indication of an interrupt via a second interface (e.g., over an EDC pin or a pin dedicated to carrying indications of interrupts). Host device 305-a may receive the interrupt indication.

At 520, memory device 310-a may transmit an error detection code for the data via the second interface based on the read command. Host device 305-a may receive the error detection code. The indication of the interrupt may be transmitted after at least a portion of the data is transmitted via the first interface. Generally, the interrupt indication may be transmitted before, after, or concurrently with transmitting the error detection code (that is, though FIG. 5 shows 515 as occurring before 520, 515 may instead occur after or concurrent with 520 in some cases).

For instance, if transmitted before or after, the indication of the interrupt may be an explicit flag dedicated to the indication of the interrupt. Alternatively, memory device 310-a may determine an error detection code based on the data; determine a bitwise inversion of the error detection code; and transmit the indication of the interrupt concurrently with the error detection code by transmitting the bitwise inversion of the error detection code. In such cases, host device 305-a may determine a second error detection code based on the data; determining that the error detection code is a bitwise inversion of the second error detection code; and may identify the error detection code as including the indication of the interrupt based on the error detection code being the bitwise inversion of the second error detection code.

At 525, host device 305-a may alter a sequence of operations based on receiving the indication of the interrupt via the second interface. For instance, host device 305-a may perform 530, described below, as part of the altered sequence of operations.

At 530, host device 305-a may transmit a request for information via a third interface after receiving the indication of the interruption. Memory device 310-a may receive the request for information.

At 535, memory device 310-a may transmit, based on the request, an indication of a value of an operating parameter for memory device 310-a via the third interface. Host device 305-a may receive the indication of the value of the operating parameter. In some cases, the third interface may be a JTAG interface.

Figure 6:
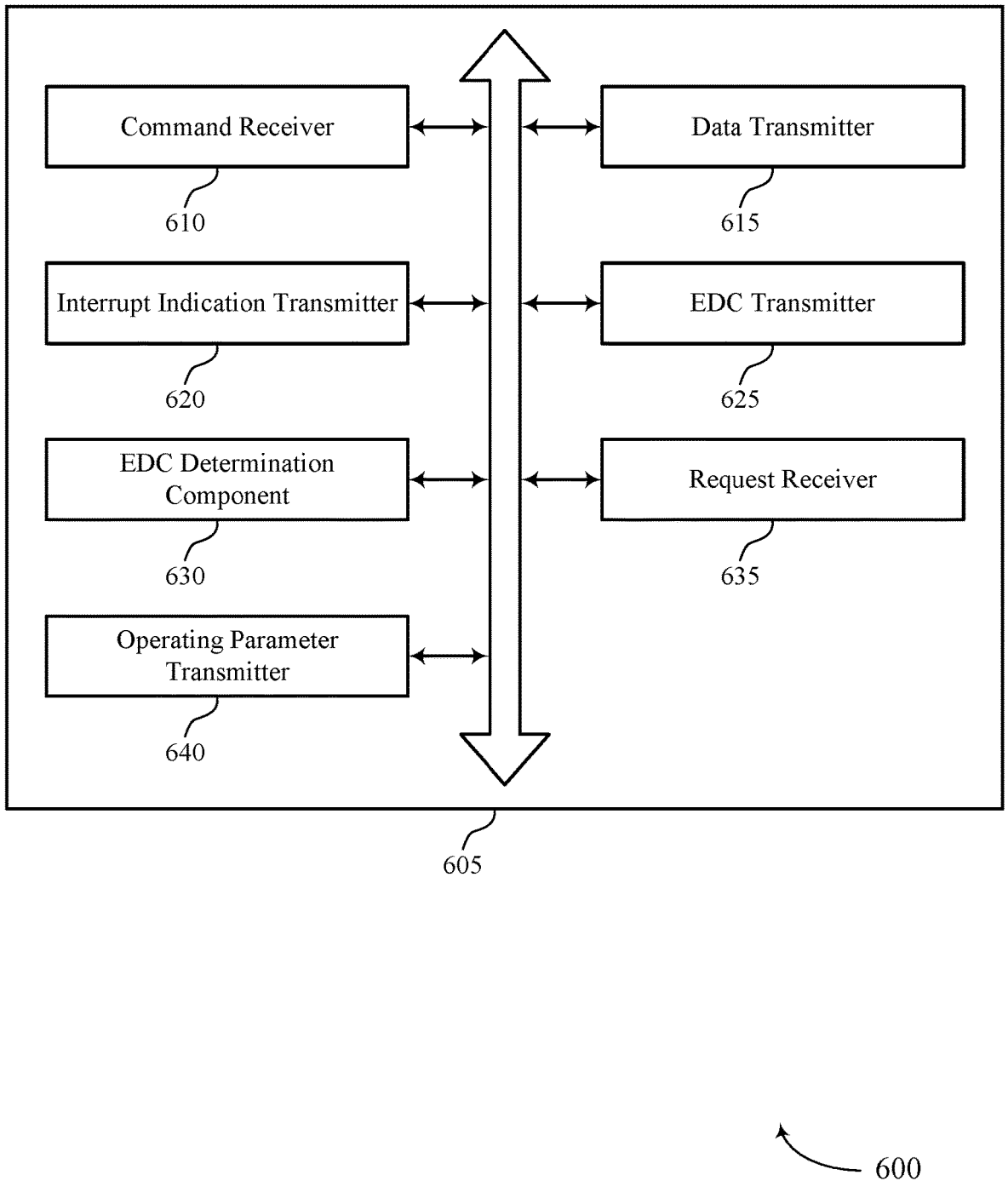
FIG. 6 shows a block diagram of a memory device that supports interrupt signaling for a memory device in accordance with examples as disclosed herein.

FIG. 6 shows a block diagram 600 of a memory device 605 that supports interrupt signaling for a memory device in accordance with examples as disclosed herein. The memory device 605 may be an example of aspects of a memory device 110 and/or 310 as described with reference to FIGS. 1 and/or 3. The memory device 605 may include a command receiver 610, a data transmitter 615, an interrupt indication transmitter 620, an EDC transmitter 625, an EDC determination component 630, a request receiver 635, and an operating parameter transmitter 640. Each of these modules may communicate, directly or indirectly, with one another (e.g., via one or more buses).

The command receiver 610 may receive, at a memory device, a read command for data stored at the memory device.

The data transmitter 615 may transmit, based on receiving the read command, the data via a first interface. In some cases, the first interface includes a data interface.

The interrupt indication transmitter 620 may transmit, based on receiving the read command, an indication of an interrupt via a second interface. In some cases, the second interface includes a pin dedicated to carrying indications of interrupts. In some cases, the interrupt is configured to alter a sequence of operations by a host device for the memory device.

The EDC transmitter 625 may transmit, based on the read command, an error detection code for the data via the second interface. In some cases, the indication of the interrupt is transmitted via the second interface before the error detection code is transmitted via the second interface. In some cases, the indication of the interrupt is transmitted via the second interface after at least a portion of the data is transmitted via the first interface. In some cases, the indication of the interrupt is transmitted via the second interface after the error detection code is transmitted via the second interface. In some cases, the indication of the interrupt and the error detection code are transmitted concurrently via the second interface. In some cases, the second interface includes an error detection code (EDC) pin.

The EDC determination component 630 may determine the error detection code based on the data. In some examples, determining a bitwise inversion of the error detection code; where concurrently transmitting the indication of the interrupt and the error detection code includes transmitting the bitwise inversion of the error detection code.

The request receiver 635 may receive, after transmitting the indication of the interrupt, a request for information via a third interface.

The operating parameter transmitter 640 may transmit, based on the request, an indication of a value of an operating parameter for the memory device via the third interface. In some cases, the third interface includes a JTAG interface.

Figure 7:
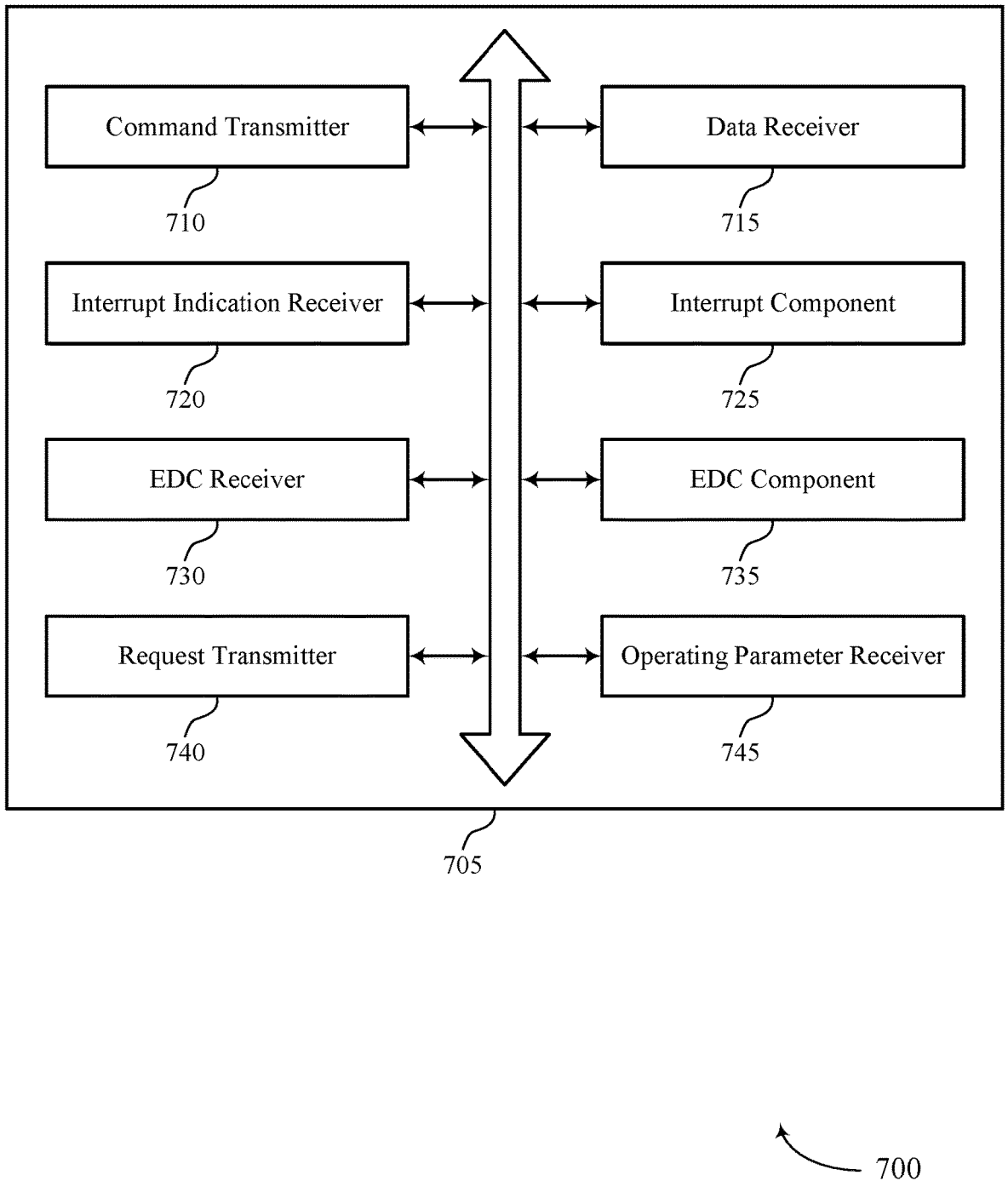
FIG. 7 shows a block diagram of a host device that supports interrupt signaling for a memory device in accordance with examples as disclosed herein.

FIG. 7 shows a block diagram 700 of a host device 705 that supports interrupt signaling for a memory device in accordance with examples as disclosed herein. The host device 705 may be an example of aspects of a host device 105 and/or 305 as described with reference to FIGS. 1 and 3. The host device 705 may include a command transmitter 710, a data receiver 715, an interrupt indication receiver 720, an interrupt component 725, an EDC receiver 730, an EDC component 735, a request transmitter 740, and an operating parameter receiver 745. Each of these modules may communicate, directly or indirectly, with one another (e.g., via one or more buses).

The command transmitter 710 may transmit, to a memory device, a read command for data.

The data receiver 715 may receive, based on the read command, the data via a first interface. In some cases, the first interface includes a data interface.

The interrupt indication receiver 720 may receive, based on the read command, an indication of an interrupt via a second interface. In some cases, the second interface includes an error detection code pin. In some cases, the second interface includes a pin dedicated to carrying indications of interrupts.

The interrupt component 725 may alter a sequence of operations based on receiving the indication of the interrupt via the second interface.

The EDC receiver 730 may receive, based on the read command, an error detection code for the data via the second interface. In some cases, the indication of the interrupt is received via the second interface before the error detection code is received via the second interface. In some cases, the indication of the interrupt is received via the second interface after at least a portion of the data is received via the first interface. In some cases, the indication of the interrupt is received via the second interface after the error detection code is received via the second interface. In some cases, the indication of the interrupt and the error detection code are received concurrently via the second interface.

The EDC component 735 may determine a second error detection code based on the data. In some examples, the EDC component 735 may determine that the error detection code is a bitwise inversion of the second error detection code. In some examples, the EDC component 735 may identify the error detection code as including the indication of the interrupt based on the error detection code being the bitwise inversion of the second error detection code.

The request transmitter 740 may transmit, after receiving the indication of the interrupt, a request for information via a third interface. In some cases, the third interface includes a JTAG interface.

The operating parameter receiver 745 may receive, based on the request, an indication of a value of an operating parameter for the memory device via the third interface.

Figure 8:
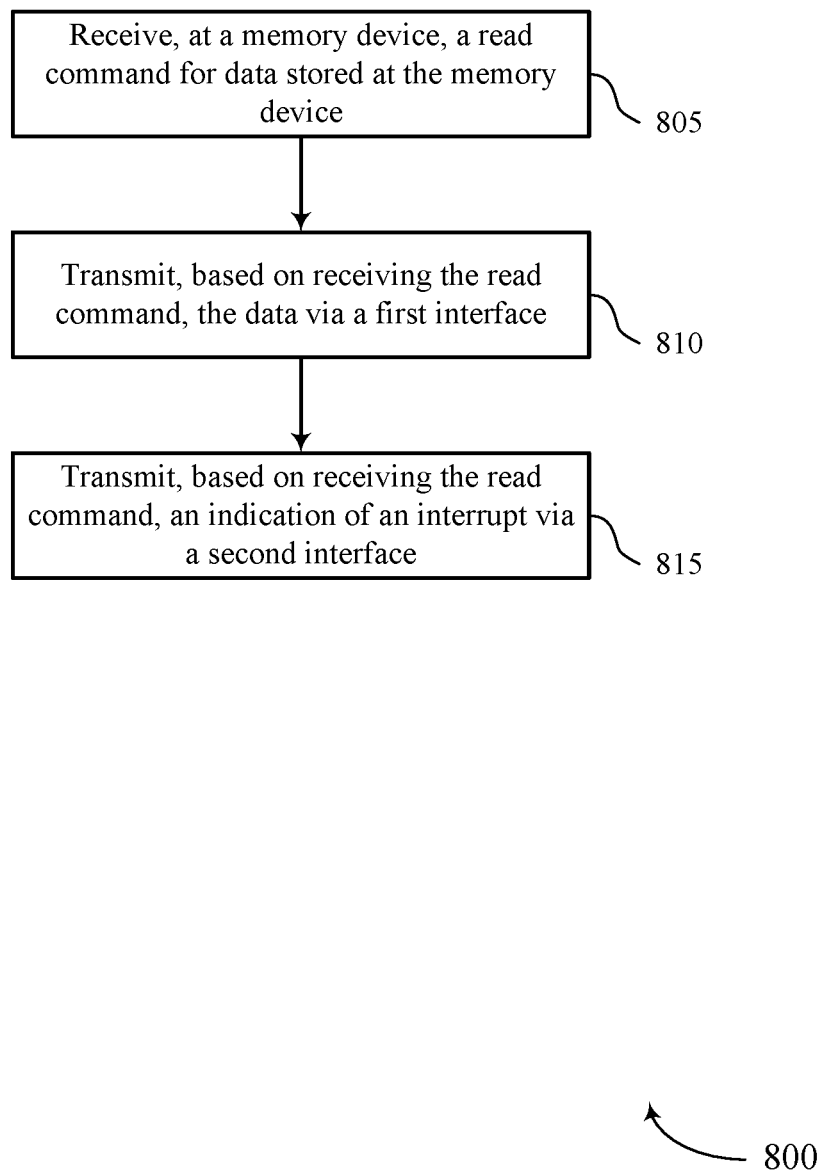
FIGS. 8 through 11 show flowcharts illustrating a method or methods that support interrupt signaling for a memory device in accordance with examples as disclosed herein.

FIG. 8 shows a flowchart illustrating a method or methods 800 that supports interrupt signaling for a memory device in accordance with examples as disclosed herein. The operations of method 800 may be implemented by a memory device or its components as described herein. For example, the operations of method 800 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 805, the memory device may receive, at a memory device, a read command for data stored at the memory device. The operations of 805 may be performed according to the methods described herein. In some examples, aspects of the operations of 805 may be performed by a command receiver as described with reference to FIG. 6.

At 810, the memory device may transmit, based on receiving the read command, the data via a first interface. The operations of 810 may be performed according to the methods described herein. In some examples, aspects of the operations of 810 may be performed by a data transmitter as described with reference to FIG. 6.

At 815, the memory device may transmit, based on receiving the read command, an indication of an interrupt via a second interface. The operations of 815 may be performed according to the methods described herein. In some examples, aspects of the operations of 815 may be performed by an interrupt indication transmitter as described with reference to FIG. 6.

In some examples, an apparatus as described herein may perform a method or methods, such as the method 800. The apparatus may include features, means, or instructions (e.g., a non-transitory computer-readable medium storing instructions executable by a processor) for receiving, at a memory device, a read command for data stored at the memory device, transmitting, based on receiving the read command, the data via a first interface, and transmitting, based on receiving the read command, an indication of an interrupt via a second interface.

Some examples of the method 800 and the apparatus described herein may further include operations, features, means, or instructions for transmitting, based on the read command, an error detection code for the data via the second interface.

In some examples of the method 800 and the apparatus described herein, the indication of the interrupt may be transmitted via the second interface before the error detection code may be transmitted via the second interface.

In some examples of the method 800 and the apparatus described herein, the indication of the interrupt may be transmitted via the second interface after at least a portion of the data may be transmitted via the first interface.

In some examples of the method 800 and the apparatus described herein, the indication of the interrupt may be transmitted via the second interface after the error detection code may be transmitted via the second interface.

In some examples of the method 800 and the apparatus described herein, the indication of the interrupt and the error detection code may be transmitted concurrently via the second interface.

Some examples of the method 800 and the apparatus described herein may further include operations, features, means, or instructions for determining the error detection code based on the data, and determining a bitwise inversion of the error detection code; where concurrently transmitting the indication of the interrupt and the error detection code includes transmitting the bitwise inversion of the error detection code.

In some examples of the method 800 and the apparatus described herein, the second interface includes an error detection code (EDC) pin.

In some examples of the method 800 and the apparatus described herein, the second interface includes a pin dedicated to carrying indications of interrupts.

Some examples of the method 800 and the apparatus described herein may further include operations, features, means, or instructions for receiving, after transmitting the indication of the interrupt, a request for information via a third interface, and transmitting, based on the request, an indication of a value of an operating parameter for the memory device via the third interface.

In some examples of the method 800 and the apparatus described herein, the third interface includes a JTAG interface.

In some examples of the method 800 and the apparatus described herein, the interrupt may be configured to alter a sequence of operations by a host device for the memory device.

In some examples of the method 800 and the apparatus described herein, the first interface includes a data interface.

Figure 9:
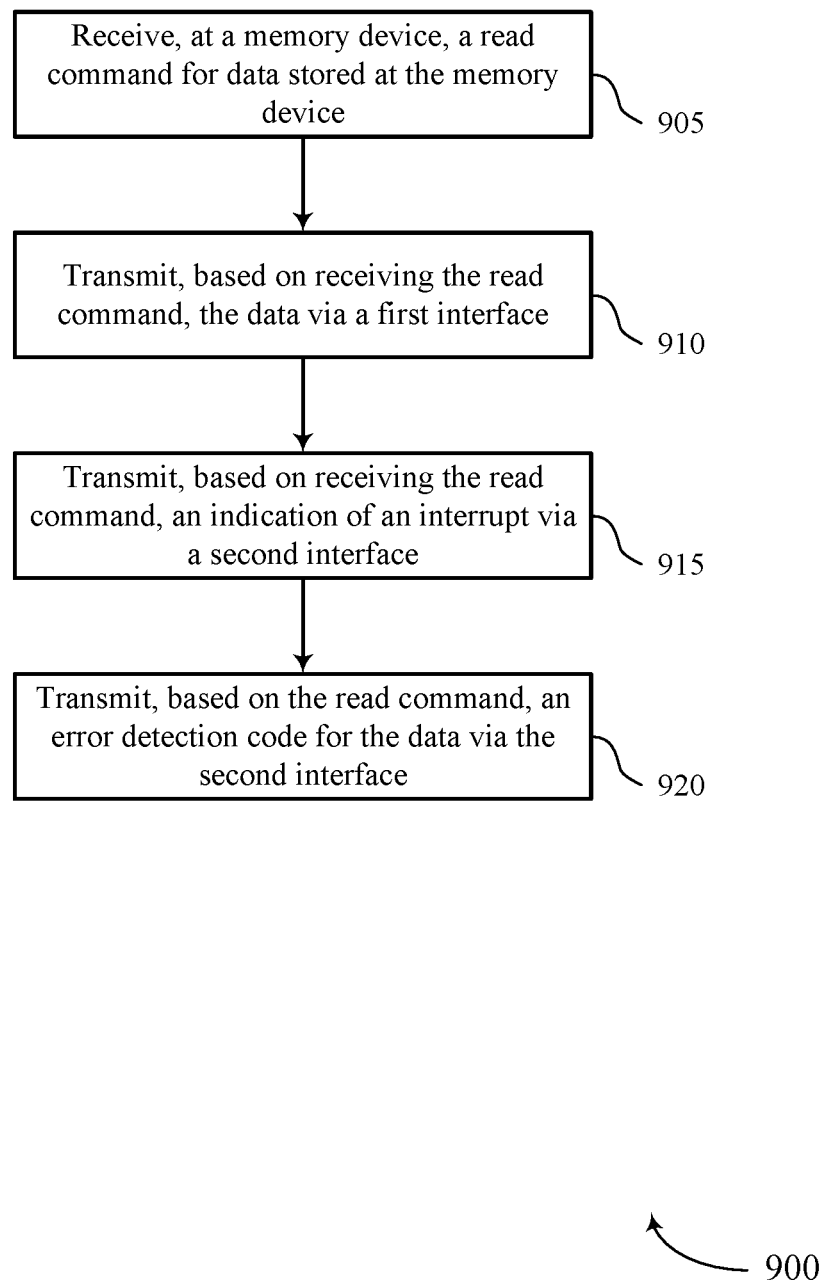

FIG. 9 shows a flowchart illustrating a method or methods 900 that supports interrupt signaling for a memory device in accordance with examples as disclosed herein. The operations of method 900 may be implemented by a memory device or its components as described herein. For example, the operations of method 900 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 905, the memory device may receive, at a memory device, a read command for data stored at the memory device. The operations of 905 may be performed according to the methods described herein. In some examples, aspects of the operations of 905 may be performed by a command receiver as described with reference to FIG. 6.

At 910, the memory device may transmit, based on receiving the read command, the data via a first interface. The operations of 910 may be performed according to the methods described herein. In some examples, aspects of the operations of 910 may be performed by a data transmitter as described with reference to FIG. 6.

At 915, the memory device may transmit, based on receiving the read command, an indication of an interrupt via a second interface. The operations of 915 may be performed according to the methods described herein. In some examples, aspects of the operations of 915 may be performed by an interrupt indication transmitter as described with reference to FIG. 6.

At 920, the memory device may transmit, based on the read command, an error detection code for the data via the second interface. The operations of 920 may be performed according to the methods described herein. In some examples, aspects of the operations of 920 may be performed by an EDC transmitter as described with reference to FIG. 6.

Figure 10:
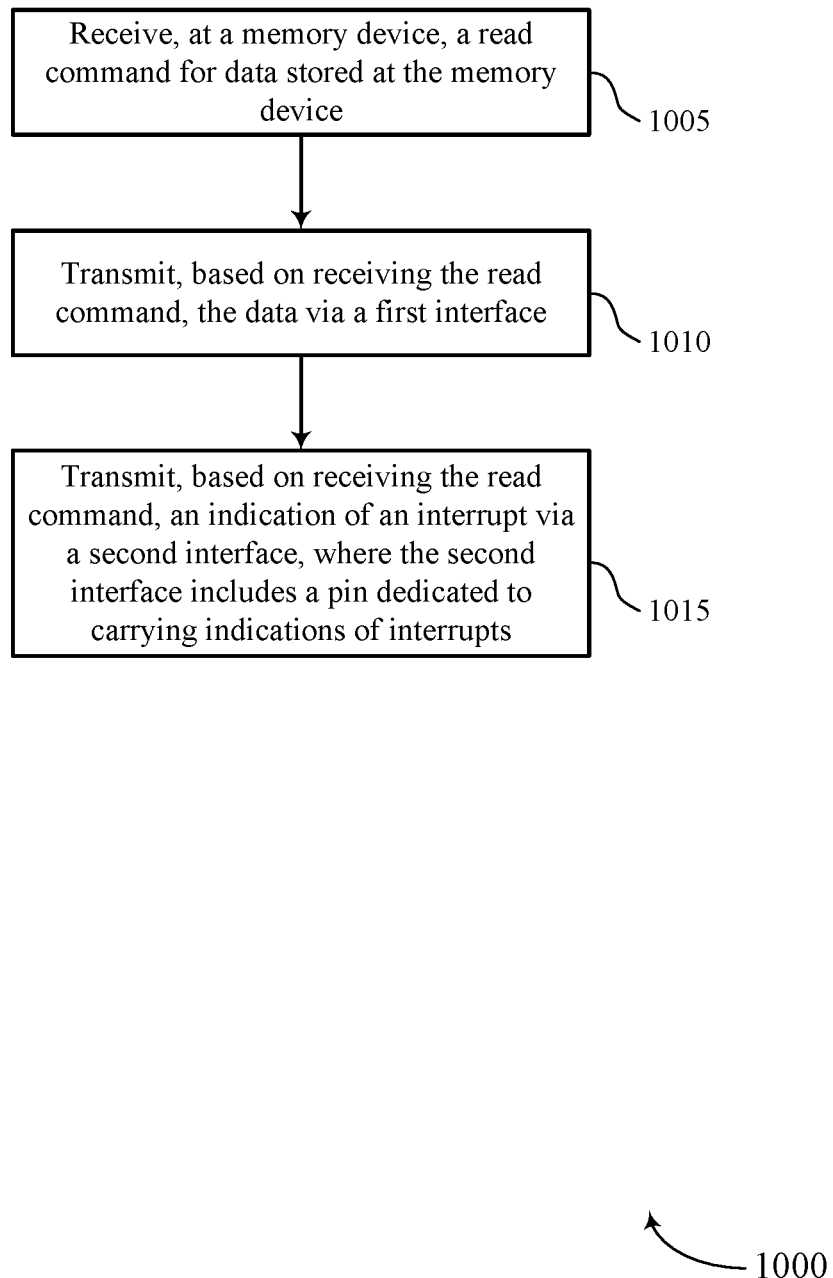

FIG. 10 shows a flowchart illustrating a method or methods 1000 that supports interrupt signaling for a memory device in accordance with examples as disclosed herein. The operations of method 1000 may be implemented by a memory device or its components as described herein. For example, the operations of method 1000 may be performed by a memory device as described with reference to FIG. 6. In some examples, a memory device may execute a set of instructions to control the functional elements of the memory device to perform the described functions. Additionally or alternatively, a memory device may perform aspects of the described functions using special-purpose hardware.

At 1005, the memory device may receive, at a memory device, a read command for data stored at the memory device. The operations of 1005 may be performed according to the methods described herein. In some examples, aspects of the operations of 1005 may be performed by a command receiver as described with reference to FIG. 6.

At 1010, the memory device may transmit, based on receiving the read command, the data via a first interface. The operations of 1010 may be performed according to the methods described herein. In some examples, aspects of the operations of 1010 may be performed by a data transmitter as described with reference to FIG. 6.

At 1015, the memory device may transmit, based on receiving the read command, an indication of an interrupt via a second interface, where the second interface includes a pin dedicated to carrying indications of interrupts. The operations of 1015 may be performed according to the methods described herein. In some examples, aspects of the operations of 1015 may be performed by an interrupt indication transmitter as described with reference to FIG. 6.

Figure 11:
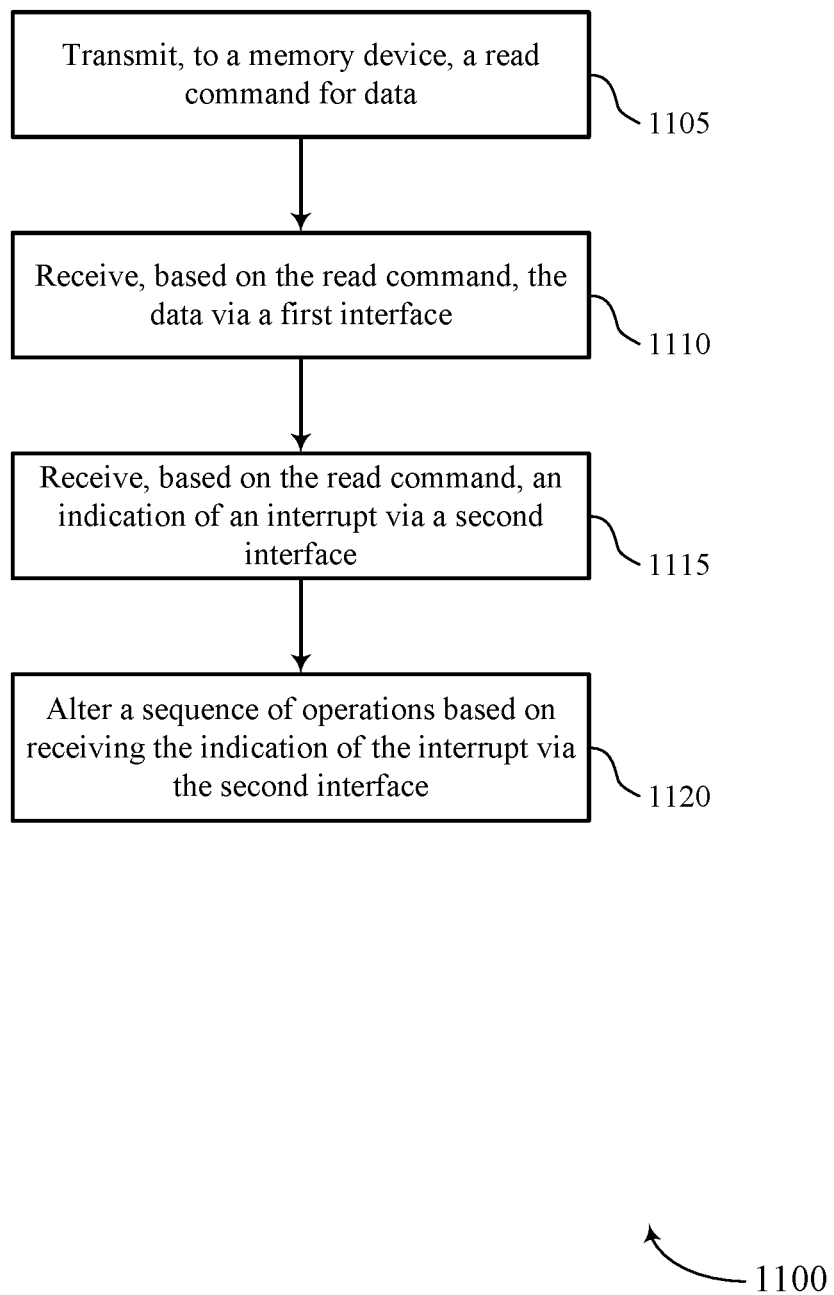

FIG. 11 shows a flowchart illustrating a method or methods 1100 that supports interrupt signaling for a memory device in accordance with examples as disclosed herein. The operations of method 1100 may be implemented by a host device or its components as described herein. For example, the operations of method 1100 may be performed by a host device as described with reference to FIG. 7. In some examples, a host device may execute a set of instructions to control the functional elements of the host device to perform the described functions. Additionally or alternatively, a host device may perform aspects of the described functions using special-purpose hardware.

At 1105, the host device may transmit, to a memory device, a read command for data. The operations of 1105 may be performed according to the methods described herein. In some examples, aspects of the operations of 1105 may be performed by a command transmitter as described with reference to FIG. 7.

At 1110, the host device may receive, based on the read command, the data via a first interface. The operations of 1110 may be performed according to the methods described herein. In some examples, aspects of the operations of 1110 may be performed by a data receiver as described with reference to FIG. 7.

At 1115, the host device may receive, based on the read command, an indication of an interrupt via a second interface. The operations of 1115 may be performed according to the methods described herein. In some examples, aspects of the operations of 1115 may be performed by an interrupt indication receiver as described with reference to FIG. 7.

At 1120, the host device may alter a sequence of operations based on receiving the indication of the interrupt via the second interface. The operations of 1120 may be performed according to the methods described herein. In some examples, aspects of the operations of 1120 may be performed by an interrupt component as described with reference to FIG. 7.

In some examples, an apparatus as described herein may perform a method or methods, such as the method 1100. The apparatus may include features, means, or instructions (e.g., a non-transitory computer-readable medium storing instructions executable by a processor) for transmitting, to a memory device, a read command for data, receiving, based on the read command, the data via a first interface, receiving, based on the read command, an indication of an interrupt via a second interface, and altering a sequence of operations based on receiving the indication of the interrupt via the second interface.

Some examples of the method 1100 and the apparatus described herein may further include operations, features, means, or instructions for receiving, based on the read command, an error detection code for the data via the second interface.

In some examples of the method 1100 and the apparatus described herein, the indication of the interrupt may be received via the second interface before the error detection code may be received via the second interface.

In some examples of the method 1100 and the apparatus described herein, the indication of the interrupt may be received via the second interface after at least a portion of the data may be received via the first interface.

In some examples of the method 1100 and the apparatus described herein, the indication of the interrupt may be received via the second interface after the error detection code may be received via the second interface.

In some examples of the method 1100 and the apparatus described herein, the indication of the interrupt and the error detection code may be received concurrently via the second interface.

Some examples of the method 1100 and the apparatus described herein may further include operations, features, means, or instructions for determining a second error detection code based on the data, determining that the error detection code may be a bitwise inversion of the second error detection code, and identifying the error detection code as including the indication of the interrupt based on the error detection code being the bitwise inversion of the second error detection code.

In some examples of the method 1100 and the apparatus described herein, the second interface includes an error detection code pin.

In some examples of the method 1100 and the apparatus described herein, the second interface includes a pin dedicated to carrying indications of interrupts.

Some examples of the method 1100 and the apparatus described herein may further include operations, features, means, or instructions for transmitting, after receiving the indication of the interrupt, a request for information via a third interface, and receiving, based on the request, an indication of a value of an operating parameter for the memory device via the third interface.

In some examples of the method 1100 and the apparatus described herein, the third interface includes a JTAG interface.

In some examples of the method 1100 and the apparatus described herein, the first interface includes a data interface.

It should be noted that the methods described above describe possible implementations, and that the operations and the steps may be rearranged or otherwise modified and that other implementations are possible. Further, portions from two or more of the methods may be combined.

An apparatus is described. The apparatus may include a memory array operable to store data, a command address interface operable to receive an access command associated with the data, a data interface operable to exchange the data with the memory array, and a third interface operable to transmit an indication of an interrupt based on the access command and a condition of the apparatus.

Some examples of the apparatus may include an error detection component coupled with the third interface and operable to determine an error detection code for the data, where the third interface includes an error detection code pin.

Some examples of the apparatus may include an interrupt component coupled with the error detection code pin and operable to transmit a signal via the error detection code pin before or after the error detection code may be transmitted via the error detection code pin, the signal including the indication of the interrupt.

Some examples of the apparatus may include an interrupt component coupled with the error detection code pin and operable to invert bits of the error detection code, where the indication of the interrupt includes the inverted bits of the error detection code.

In some examples, the third interface includes a pin dedicated to transmitting indications of interrupts.

Some examples of the apparatus may include a JTAG interface operable to transmit an indication of the condition of the apparatus.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof. Some drawings may illustrate signals as a single signal; however, it will be understood by a person of ordinary skill in the art that the signal may represent a bus of signals, where the bus may have a variety of bit widths.

The terms "electronic communication," "conductive contact," "connected," and "coupled" may refer to a relationship between components that supports the flow of signals between the components. Components are considered in electronic communication with (or in conductive contact with or connected with or coupled with) one another if there is any conductive path between the components that can, at any time, support the flow of signals between the components. At any given time, the conductive path between components that are in electronic communication with each other (or in conductive contact with or connected with or coupled with) may be an open circuit or a closed circuit based on the operation of the device that includes the connected components. The conductive path between connected components may be a direct conductive path between the components or the conductive path between connected components may be an indirect conductive path that may include intermediate components, such as switches, transistors, or other components. In some examples, the flow of signals between the connected components may be interrupted for a time, for example, using one or more intermediate components such as switches or transistors.

The term "coupling" refers to condition of moving from an open-circuit relationship between components in which signals are not presently capable of being communicated between the components over a conductive path to a closed-circuit relationship between components in which signals are capable of being communicated between components over the conductive path. When a component, such as a controller, couples other components together, the component initiates a change that allows signals to flow between the other components over a conductive path that previously did not permit signals to flow.

The term "isolated" refers to a relationship between components in which signals are not presently capable of flowing between the components. Components are isolated from each other if there is an open circuit between them. For example, two components separated by a switch that is positioned between the components are isolated from each other when the switch is open. When a controller isolates two components, the controller affects a change that prevents signals from flowing between the components using a conductive path that previously permitted signals to flow.

The devices discussed herein, including a memory array, may be formed on a semiconductor substrate, such as silicon, germanium, silicon-germanium alloy, gallium arsenide, gallium nitride, etc. In some examples, the substrate is a semiconductor wafer. In other examples, the substrate may be a silicon-on-insulator (SOI) substrate, such as silicon-on-glass (SOG) or silicon-on-sapphire (SOP), or epitaxial layers of semiconductor materials on another substrate. The conductivity of the substrate, or sub-regions of the substrate, may be controlled through doping using various chemical species including, but not limited to, phosphorous, boron, or arsenic. Doping may be performed during the initial formation or growth of the substrate, by ion-implantation, or by any other doping means.

A switching component or a transistor discussed herein may represent a field-effect transistor (FET) and comprise a three terminal device including a source, drain, and gate. The terminals may be connected to other electronic elements through conductive materials, e.g., metals. The source and drain may be conductive and may comprise a heavily-doped, e.g., degenerate, semiconductor region. The source and drain may be separated by a lightly-doped semiconductor region or channel. If the channel is n-type (i.e., majority carriers are signals), then the FET may be referred to as a n-type FET. If the channel is p-type (i.e., majority carriers are holes), then the FET may be referred to as a p-type FET. The channel may be capped by an insulating gate oxide. The channel conductivity may be controlled by applying a voltage to the gate. For example, applying a positive voltage or negative voltage to an n-type FET or a p-type FET, respectively, may result in the channel becoming conductive. A transistor may be "on" or "activated" when a voltage greater than or equal to the transistor's threshold voltage is applied to the transistor gate. The transistor may be "off" or "deactivated" when a voltage less than the transistor's threshold voltage is applied to the transistor gate.

The description set forth herein, in connection with the appended drawings, describes example configurations and does not represent all the examples that may be implemented or that are within the scope of the claims. The term "exemplary" used herein means "serving as an example, instance, or illustration," and not "preferred" or "advantageous over other examples." The detailed description includes specific details to providing an understanding of the described techniques. These techniques, however, may be practiced without these specific details. In some instances, well-known structures and devices are shown in block diagram form to avoid obscuring the concepts of the described examples.

In the appended figures, similar components or features may have the same reference label. Further, various components of the same type may be distinguished by following the reference label by a dash and a second label that distinguishes among the similar components. If just the first reference label is used in the specification, the description is applicable to any one of the similar components having the same first reference label irrespective of the second reference label.

Information and signals described herein may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The various illustrative blocks and modules described in connection with the disclosure herein may be implemented or performed with a general-purpose processor, a DSP, an ASIC, an FPGA or other programmable logic device, discrete gate or transistor logic, discrete hardware components, or any combination thereof designed to perform the functions described herein. A general-purpose processor may be a microprocessor, but in the alternative, the processor may be any processor, controller, microcontroller, or state machine. A processor may also be implemented as a combination of computing devices (e.g., a combination of a DSP and a microprocessor, multiple microprocessors, one or more microprocessors in conjunction with a DSP core, or any other such configuration).

The functions described herein may be implemented in hardware, software executed by a processor, firmware, or any combination thereof. If implemented in software executed by a processor, the functions may be stored on or transmitted over as one or more instructions or code on a computer-readable medium. Other examples and implementations are within the scope of the disclosure and appended claims. For example, due to the nature of software, functions described above can be implemented using software executed by a processor, hardware, firmware, hardwiring, or combinations of any of these. Features implementing functions may also be physically located at various positions, including being distributed such that portions of functions are implemented at different physical locations. Also, as used herein, including in the claims, "or" as used in a list of items (for example, a list of items prefaced by a phrase such as "at least one of" or "one or more of") indicates an inclusive list such that, for example, a list of at least one of A, B, or C means A or B or C or AB or AC or BC or ABC (i.e., A and B and C). Also, as used herein, the phrase "based on" shall not be construed as a reference to a closed set of conditions. For example, an exemplary step that is described as "based on condition A" may be based on both a condition A and a condition B without departing from the scope of the present disclosure. In other words, as used herein, the phrase "based on" shall be construed in the same manner as the phrase "based at least in part on."

The description herein is provided to enable a person skilled in the art to make or use the disclosure. Various modifications to the disclosure will be apparent to those skilled in the art, and the generic principles defined herein may be applied to other variations without departing from the scope of the disclosure. Thus, the disclosure is not limited to the examples and designs described herein, but is to be accorded the broadest scope consistent with the principles and novel features disclosed herein.

What is claimed is:

1. A method, comprising:
   receiving, at a memory device, a read command for data stored at the memory device;
   transmitting, based at least in part on receiving the read command, the data via a first interface;
   generating, based at least in part on the read command, an error detection code for the data;
   transmitting, based at least in part on receiving the read command, an indication of an interrupt via a second interface, wherein the indication of the interrupt comprises a bitwise inversion of the error detection code;
   receiving, after transmitting the indication of the interrupt via the second interface, a request for information via a third interface; and
   transmitting, based at least in part on the request, an indication of a value of an operating parameter for the memory device via the third interface, wherein the value of the operating parameter is indicative of an operational condition associated with the memory device, and wherein the operating parameter comprises a voltage, a temperature, a status of one or more fuses, a PLL status, or a flag indicating an operability of the memory device.

2. The method of claim 1, wherein the indication of the interrupt is transmitted via the second interface after at least a portion of the data is transmitted via the first interface.

3. The method of claim 1, wherein the second interface comprises an error detection code (EDC) pin.

4. The method of claim 1, wherein the second interface comprises a pin dedicated to carrying indications of interrupts.

5. The method of claim 1, wherein the third interface comprises a Joint Test Action Group (JTAG) interface.

6. The method of claim 1, wherein the interrupt is configured to alter a sequence of operations by a host device for the memory device.

7. The method of claim 1, wherein the first interface comprises a data interface.

8. A method, comprising:
   transmitting, to a memory device, a read command for data;
   receiving, based at least in part on the read command, the data via a first interface;
   receiving, based at least in part on the read command, an indication of an interrupt via a second interface;
   determining whether the indication of the interrupt comprises a bitwise inversion of an error detection code associated with the data;
   altering a sequence of operations based at least in part on determining that the indication of the interrupt comprises the bitwise inversion of the error detection code;
   transmitting, after receiving the indication of the interrupt via the second interface and based at least in part on altering the sequence of operations, a request for information via a third interface; and
   receiving, based at least in part on the request, an indication of a value of an operating parameter for the memory device via the third interface, wherein the value of the operating parameter is indicative of an operational condition associated with the memory device, and wherein the operating parameter comprises a voltage, a temperature, a status of one or more fuses, a PLL status, or a flag indicating an operability of the memory device.

9. The method of claim 8, wherein the indication of the interrupt is received via the second interface after at least a portion of the data is received via the first interface.

10. The method of claim 8, wherein the second interface comprises an error detection code pin, or wherein the second interface comprises a pin dedicated to carrying indications of interrupts.

11. A memory system, comprising:
    one or more memory arrays operable to store data;
    a command address interface operable to receive an access command associated with the data;
    a data interface operable to exchange the data with the one or more memory arrays;
    a third interface operable to transmit an indication of an interrupt based at least in part on the access command and a condition of the memory system;
    an error detection component coupled with the third interface and operable to determine an error detection code for the data, wherein the third interface comprises an error detection code pin;
    an interrupt component coupled with the error detection code pin and operable to transmit a signal via the error detection code pin, the signal comprising the indication of the interrupt, wherein the indication of the interrupt comprises a bitwise inversion of the error detection code;
    a fourth interface operable to receive, after transmission of the indication of the interrupt via the third interface, a request for information; and
    the fourth interface further operable to transmit, based at least in part on the request, an indication of a value of an operating parameter for the memory system, wherein the value of the operating parameter is indicative of an operational condition associated with the memory system, and wherein the operating parameter comprises a voltage, a temperature, a status of one or more fuses, a PLL status, or a flag indicating an operability of the memory system.

12. The memory system of claim 11, wherein the third interface comprises a pin dedicated to transmitting indications of interrupts.

13. The method of claim 1, further comprising:
    refraining from transmitting the error detection code associated with the data based at least in part on transmitting the bitwise inversion of the error detection code.

* * * * *